United States Patent
Li et al.

(10) Patent No.: US 12,474,681 B2
(45) Date of Patent: Nov. 18, 2025

(54) MATCHING METHOD AND APPARATUS FOR MANUFACTURING LIQUID CRYSTAL DISPLAY DEVICE, AND SYSTEM AND MEDIUM THEREOF

(71) Applicants: Hefei BOE Optoelectronics Technology Co., Ltd., Anhui (CN); BOE Technology Group Co., Ltd., Beijing (CN)

(72) Inventors: Jingyong Li, Beijing (CN); Fei Xu, Beijing (CN); Xinyu Wang, Beijing (CN); Jun Hong, Beijing (CN); Yanbin Wang, Beijing (CN); Wenhong Tian, Beijing (CN)

(73) Assignees: HEFEI BOE OPTOELECTRONICS TECHNOLOGY CO., LTD., Anhui (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 538 days.

(21) Appl. No.: 17/914,763

(22) PCT Filed: May 28, 2021

(86) PCT No.: PCT/CN2021/096957
§ 371 (c)(1),
(2) Date: Sep. 27, 2022

(87) PCT Pub. No.: WO2022/246842
PCT Pub. Date: Dec. 1, 2022

(65) Prior Publication Data
US 2023/0333524 A1    Oct. 19, 2023

(51) Int. Cl.
*G05B 15/02*    (2006.01)
*G02F 1/13357*    (2006.01)

(52) U.S. Cl.
CPC ............ *G05B 15/02* (2013.01); *G02F 1/1336* (2013.01)

(58) Field of Classification Search
CPC ... G05B 15/02; G02F 1/1336; G02F 2203/69; G02F 1/1309; G02F 1/1306
See application file for complete search history.

(56) References Cited

U.S. PATENT DOCUMENTS

| | | | |
|---|---|---|---|
| 2017/0005530 A1* | 1/2017 | Zeine | G05B 15/02 |
| 2020/0073176 A1 | 3/2020 | Miyazaki | |
| 2021/0364863 A1* | 11/2021 | Zheng | G02F 1/133624 |

FOREIGN PATENT DOCUMENTS

| | | |
|---|---|---|
| CN | 1360220 A | 7/2002 |
| CN | 1690797 A | 11/2005 |

(Continued)

OTHER PUBLICATIONS

"Geological Data Commonly Used Mathematical Statistics—Normal Distribution," edited by Qiming Jiang and Tiaojian Lu, Harbin Engineering University Press, Jan. 2010, 13pp.

(Continued)

*Primary Examiner* — Charles Cai
(74) *Attorney, Agent, or Firm* — XSENSUS LLP

(57) ABSTRACT

Provided is a matching method for manufacturing a liquid crystal display (LCD) device. The method includes: acquiring luminance data of a plurality of backlight modules and transmittance data of a plurality of LCD panels under a same driving condition; acquiring N backlight groups by grouping the plurality of backlight modules based on the luminance data; acquiring N panel groups by grouping the plurality of LCD panels based on the transmittance data; and determining a corresponding relationship between the backlight group and the panel group.

18 Claims, 9 Drawing Sheets

(56) References Cited

FOREIGN PATENT DOCUMENTS

| CN | 102298908 | A  |   | 12/2011 |         |           |
|----|-----------|----|---|---------|---------|-----------|
| CN | 106292011 | A  |   |  1/2017 |         |           |
| CN | 108732808 | A  |   | 11/2018 |         |           |
| CN | 109270738 | A  |   |  1/2019 |         |           |
| CN | 110308576 | A  | * | 10/2019 | ........ | G02F 1/1303 |
| CN | 110441957 | A  |   | 11/2019 |         |           |
| CN | 110456534 | A  |   | 11/2019 |         |           |
| CN | 210090870 | U  |   |  2/2020 |         |           |
| CN | 111897154 | A  |   | 11/2020 |         |           |
| JP |   4907012 | B2 | * |  3/2012 | ........ | C08F 6/18 |
| KR | 100801438 | B1 | * | 10/2006 |         |           |
| KR | 101720009 | B1 | * |  7/2015 |         |           |

OTHER PUBLICATIONS

International Search Report and Written Opinion mailed on Mar. 1, 2022, received for PCT Application PCT/CN/2021/096957, Filed on May 28, 2021, 9 pages.

* cited by examiner

MATCHING METHOD AND APPARATUS FOR MANUFACTURING LIQUID CRYSTAL DISPLAY DEVICE, AND SYSTEM AND MEDIUM THEREOF

CROSS-REFERENCE TO RELATED APPLICATION

The present disclosure is a U.S. national phase application based on PCT/CN2021/096957, filed on May 28, 2021, which is incorporated herein by reference in its entirety.

TECHNICAL FIELD

The present disclosure relates to the field of display technologies, and in particular, relates to a matching method and apparatus for manufacturing a liquid crystal display (LCD) device, and a system and a medium thereof.

BACKGROUND

LCD devices have many advantages such as thin in body, power saving and non-radiative, and thus are widely applied.

In the related art, an LCD device includes an LCD panel and a backlight module. In a process of manufacturing the LCD device, the LCD panel and the backlight module constitute the LCD device by random matching.

SUMMARY

Embodiments of the present disclosure provide a matching method and apparatus for manufacturing an LCD device, and a system and a medium thereof. The technical solutions are described below.

According to a first aspect of the embodiments of the present disclosure, a matching method for manufacturing an LCD device is provided. The method includes: acquiring luminance data of a plurality of backlight modules under the same driving condition and transmittance data of a plurality of LCD panels under the same driving condition; acquiring N backlight groups by grouping the plurality of backlight modules based on the corresponding luminance data, the luminance data of the backlight modules in different backlight groups being within different luminance ranges; acquiring N panel groups by grouping the plurality of LCD panels based on the transmittance data under the same driving condition, the transmittance data of the LCD panels in different panel groups being within different transmittance ranges; and determining a corresponding relationship between the backlight group and the panel group, wherein the corresponding relationship indicates matching between a target backlight module and a target LCD panel in pairs, and indicates one-to-one correspondence between the N backlight groups in a descending order of representative values of the luminance range and the N panel groups in an ascending order of representative values of the corresponding transmittance range, the target backlight module being any one of the plurality of backlight modules, the target LCD panel being an LCD panel in the panel group corresponding to the backlight group to which the target backlight module belongs, and the target backlight module and the target LCD panel matched in pairs being configured to be assembled to form the LCD device, wherein N is an integer greater than 1.

Optionally, a ratio of a number of backlight modules in the target backlight group to a total number of backlight modules in the N backlight groups is equal to a ratio of a number of LCD panels in the target panel group to a total number of LCD panels in the N panel groups, the target backlight group is any one of the N backlight groups, and the target panel group is a panel group that is in the N panel groups and corresponds to the target backlight group.

Optionally, a distribution of the luminance data of the plurality of backlight modules satisfies a normal distribution, and grouping the plurality of backlight modules based on the corresponding luminance data includes: grouping the plurality of backlight modules based on a standard normal distribution function; and a distribution of the transmittance data of the plurality of LCD panels satisfies the normal distribution, and grouping the plurality of LCD panels based on the corresponding transmittance data includes: grouping the plurality of LCD panels based on the standard normal distribution function.

Optionally, in the case that N=2, grouping the plurality of backlight modules based on the standard normal distribution function includes: organizing backlight modules with the luminance data within a range of $(u1-k1\ \sigma1, u1)$ into a first group, and organizing backlight modules with the luminance data within a range of $(u1, u1+k1\ \sigma1)$ into a second group, wherein $u1$ represents an average value of the luminance data of the backlight modules in the N backlight groups, $k1$ represents a predetermined value, $0<k1\leq3$, and $\sigma1$ represents a standard deviation of the luminance data of the backlight modules in the N backlight groups; and grouping the plurality of LCD panels based on the standard normal distribution function includes: organizing LCD panels with the transmittance data within a range of $(u2-k2\ \sigma2, u2)$ into a first group, and organizing LCD panels with the transmittance data within a range of $(u2, u2+k2\ \sigma2)$ into a second group, wherein $u2$ represents an average value of the transmittance data of the LCD panels in the N panel groups, $k2=k1$, and $\sigma2$ represents a standard deviation of the transmittance data of the LCD panels in the N panel groups.

Optionally, in the case that N=3, grouping the plurality of backlight modules based on the standard normal distribution function includes: organizing backlight modules with the luminance data within a range of $(u1-k11\ \sigma1, u1-k12\ \sigma1)$ into a first group, organizing backlight modules with the luminance data within a range of $(u1-k12\ \sigma1, u1+k12\ \sigma1)$ into a second group, and organizing backlight modules with the luminance data within a range of $(u1+k12\ \sigma1, u1+k11\ \sigma1)$ into a third group, wherein $u1$ represents an average value of the luminance data of the backlight modules in the N backlight groups, $k11$ and $k12$ represent predetermined values, $0<k12<k11\leq3$, and $\sigma1$ represents a standard deviation of the luminance data of the backlight modules in the N backlight groups; and grouping the plurality of LCD panels based on the standard normal distribution function includes: organizing LCD panels with the transmittance data within a range of $(u2-k21\ \sigma2, u2-k22\ \sigma2)$ into a first group, organizing LCD panels with the transmittance data within a range of $(u2-k22\ \sigma2, u2+k22\ \sigma2)$ into a second group, and organizing LCD panels with the transmittance data within a range of $(u+k22\sigma, u+k21\sigma)$ into a third group, wherein $u2$ represents an average value of the transmittance data of the LCD panels in the N panel groups, $k11=k21$, $k12=k22$, and $\sigma2$ represents a standard deviation of the transmittance data of the LCD panels in the N panel groups.

Optionally, acquiring N backlight groups by grouping the plurality of backlight modules based on the corresponding luminance data includes:

ranking the plurality of backlight modules in a first order based on the corresponding luminance data, the first order being one of a descending order and an ascending order; and grouping the plurality of backlight modules according to a first predetermined group number and a first predetermined ratio based on a ranking result of the plurality of backlight modules, wherein the first predetermined group number is the number of the backlight groups, and the first predetermined ratio is a number ratio of the backlight modules in each two groups of the backlight groups; and acquiring N panel groups by grouping the plurality of LCD panels based on the corresponding transmittance data includes:

ranking the plurality of LCD panels in a second order based on the corresponding transmittance data, the second order being the other of the descending order and the ascending order; and grouping the plurality of LCD panels according to a second predetermined group number and a second predetermined ratio based on a ranking result of the plurality of LCD panels, wherein the second predetermined group number is the number of the panel groups, the second predetermined ratio is a number ratio of the LCD panels in each two groups of the panel groups, the second predetermined group number is equal to the first predetermined group number, and the second predetermined ratio is equal to the first predetermined ratio.

Optionally, the method further includes any of the followings:

removing backlight modules with luminance data exceeding a predetermined luminance data range from the plurality of backlight modules prior to grouping the plurality of backlight modules; and removing LCD panels with transmittance data exceeding a predetermined transmittance data range from the plurality of LCD panels prior to grouping the plurality of LCD panels.

Optionally, the predetermined luminance data range is $(u1-k1\sigma1, u1+k1\sigma1)$, wherein $u1$ represents the average value of the luminance data of the backlight modules in the N backlight groups, $\sigma1$ represents the standard deviation of the luminance data of the backlight modules in the N backlight groups, and $2 \leq k1 \leq 3$; and the predetermined transmittance data range is $(u2-k2\sigma2, u2+k2\sigma2)$, wherein $u2$ represents the average value of the transmittance data of the LCD panels in the N panel groups, $\sigma2$ represents the standard deviation of the transmittance data of the LCD panels in the N panel groups, and $2 \leq k2 \leq 3$.

According to a second aspect of the embodiments of the present disclosure, a matching apparatus for manufacturing an LCD device is provided. The matching apparatus includes: an acquiring module, configured to acquire luminance data of a plurality of backlight modules under the same driving condition and transmittance data of a plurality of LCD panels under the same driving condition; a first grouping module, configured to acquire N backlight groups by grouping the plurality of backlight modules based on the corresponding luminance data, the luminance data of the backlight modules in different backlight groups being within different luminance ranges; a second grouping module, configured to acquire N panel groups by grouping the plurality of LCD panels based on the corresponding transmittance data, the LCD panels in different panel groups being within different transmittance ranges; and a matching module, configured to determine a corresponding relationship between the backlight group and the panel group, wherein the corresponding relationship indicates matching between a target backlight module and a target LCD panel in pairs, and indicates one-to-one correspondence between the N backlight groups in a descending order of representative values within the luminance range and the N panel groups in an ascending order of representative values within the transmittance range, the target backlight module is any one of the plurality of backlight modules, the target LCD panel is an LCD panel in the panel group corresponding to the backlight group to which the target backlight module belongs, and the target backlight module and the target LCD panel matched in pairs are configured to be assembled into an LCD device, wherein N is an integer greater than 1.

Optionally, a ratio of a number of backlight modules in the target backlight group to a total number of backlight modules in the N backlight groups is equal to a ratio of a number of LCD panels in the target panel group to a total number of LCD panels in the N panel groups, the target backlight group is any one of the N backlight groups, and the target panel group is a panel group that is in the N panel groups and corresponds to the target backlight group.

Optionally, a distribution of the luminance data of the plurality of backlight modules satisfies a normal distribution, and the first grouping module is configured to group the plurality of backlight modules based on a standard normal distribution function; and a distribution of the transmittance data of the plurality of LCD panels satisfies the normal distribution, and the second grouping module is configured to group the plurality of LCD panels based on the standard normal distribution function.

Optionally, in the case that N=2, the first grouping module is configured to organize backlight modules with the luminance data within a range of $(u1-k1\sigma1, u1)$ into a first group and organize backlight modules with the luminance data within a range of $(u1, u1+k1\sigma1)$ into a second group, wherein $u1$ represents an average value of the luminance data of the backlight modules in the N backlight groups, $k1$ represents a predetermined value, $0 < k1 \leq 3$, and $\sigma1$ represents a standard deviation of the luminance data of the backlight modules in the N backlight groups; and the second grouping module is configured to organize LCD panels with the transmittance data within a range of $(u2-k2\sigma2, u2)$ into a first group and organize LCD panels with the transmittance data within a range of $(u2, u2+k2\sigma2)$ into a second group, wherein $u2$ represents an average value of the transmittance data of the LCD panels in the N panel groups, $k2=k1$, and $\sigma2$ represents a standard deviation of the transmittance data of the LCD panels in the N panel groups.

Optionally, in the case that N=3, the first grouping module is configured to organize backlight modules with the luminance data within a range of $(u1-k11\sigma1, u1-k12\sigma1)$ into a first group, organize backlight modules with the luminance data within a range of $(u1-k12\sigma1, u1+k12\sigma1)$ into a second group, and organize backlight modules with the luminance data within a range of $(u1+k12\sigma1, u1+k11\sigma1)$ into a third group, wherein $u1$ represents an average value of the luminance data of the backlight modules in the N backlight groups, $k11$ and $k12$ represent predetermined values, $0 < k12 < k11 \leq 3$, and $\sigma1$ represents a standard deviation of the luminance data of the backlight modules in the N backlight groups; and the second grouping module is configured to organize LCD panels with the transmittance data within a range of $(u2-k21\sigma2, u2-k22\sigma2)$ into a first group, organize LCD panels with the transmittance data within a range of (u2−k22 σ2, u2+k22 σ2) into a second group, and organize LCD panels with the transmittance data within a range of (u+k22σ, u+k21σ) into a third group, wherein u2 represents an average value of the transmittance data of the LCD panels in the N panel groups, k11=k21, k12=k22, and σ2 represents a standard deviation of the transmittance data of the LCD panels in the N panel groups.

Optionally, the first grouping module is configured to rank the plurality of backlight modules in a first order based on the corresponding luminance data, the first order being one of a descending order and an ascending order; and group the plurality of backlight modules according to a first predetermined group number and a first predetermined ratio based on a ranking result of the plurality of backlight modules, wherein the first predetermined group number is a number of the backlight groups, and the first predetermined ratio is a number ratio of the backlight modules in each two groups of the backlight groups; and the second grouping module is configured to rank the plurality of LCD panels in a second order based on the corresponding transmittance data, the second order being the other of the descending order and the ascending order; and group the plurality of LCD panels according to a second predetermined group number and a second predetermined ratio based on a ranking result of the plurality of LCD panels, wherein the second predetermined group number is the number of the panel groups, the second predetermined ratio is a number ratio of the LCD panels in each two groups of the panel groups, the second predetermined group number is equal to the first predetermined group number, and the second predetermined ratio is equal to the first predetermined ratio.

Optionally, the matching apparatus further includes a removing module configured to: remove backlight modules with luminance data exceeding a predetermined luminance data range from the plurality of backlight modules prior to grouping the plurality of backlight modules; or remove LCD panels with transmittance data exceeding a predetermined transmittance data range from the plurality of LCD panels prior to grouping the plurality of LCD panels.

Optionally, the predetermined luminance data range is (u1−k1 σ1, u1+k1 σ1), wherein u1 represents the average value of the luminance data of the backlight modules in the N backlight groups, σ1 represents the standard deviation of the luminance data of the backlight modules in the N backlight groups, and 2≤k1≤3; and the predetermined transmittance data range is (u2−k2 σ2, u2+k2 σ2), wherein u2 represents the average value of the transmittance data of the LCD panels in the N panel groups, σ2 represents the standard deviation of the transmittance data of the LCD panels in the N panel groups, and 2≤k2≤3.

According to a third aspect of the embodiments of the present disclosure, a system for manufacturing an LCD device is provided. The system includes a luminance detection device, configured to detect luminance data of a plurality of backlight modules under the same driving condition; a transmittance detection device, configured to detect transmittance data of a plurality of LCD panels under the same driving condition; a master control device, configured to acquire N backlight groups by grouping the plurality of backlight modules based on the luminance data detected by the luminance data detection device, the luminance data of the backlight modules in different backlight groups being within different luminance ranges; acquire N panel groups by grouping the plurality of LCD panels based on the transmittance data detected by the transmittance detection device, the transmittance data of the LCD panels in different panel groups being within different transmittance ranges; and determine a corresponding relationship between the backlight group and the panel group, wherein the corresponding relationship indicates matching between a target backlight module and a target LCD panel in pairs, and indicates one-to-one correspondence between the N backlight groups in a descending order of representative values of the corresponding luminance range and the N panel groups in an ascending order of representative values of the corresponding transmittance range, the target backlight module is any one of the plurality of backlight modules, the target LCD panel is an LCD panel in the panel group corresponding to the backlight group to which the target backlight module belongs; and an assembly device, configured to assemble the target backlight module and the target LCD panel matched in pairs into an LCD device under the control of the master control device.

According to a fourth aspect of the embodiments of the present disclosure, a matching device for manufacturing an LCD device is provided. The matching device includes a processor and a memory; wherein the memory is configured to store one or more computer programs; and the processor is configured to load and execute the one or more computer programs to perform any of the above methods.

According to a fifth aspect of the embodiments of the present disclosure, a computer-readable storage medium storing one or more computer instructions therein is provided. The one or more computer instructions, when loaded and executed by a processor, cause the processor to perform any of the above methods.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

To help understand the embodiments of the present disclosure, firstly, a structure and a working principle of an LCD device are briefly introduced below.

Figure 1:
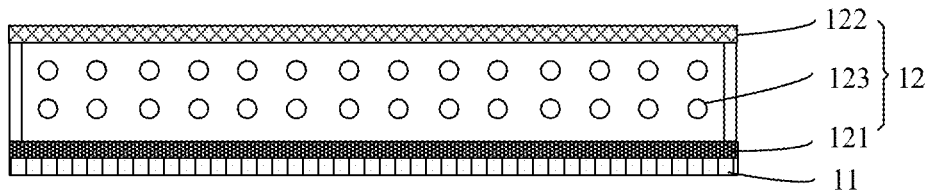
FIG. 1 is a structural schematic diagram of an LCD device according to an embodiment of the present disclosure.

FIG. 1 is a structural schematic diagram of an LCD device according to an embodiment of the present disclosure. As shown in FIG. 1, the LCD device includes a backlight module 11 and an LCD panel 12. The backlight module 11 is configured to provide a uniform backlight source for the LCD panel 12. The LCD panel 12 includes an array substrate 121, a colour film substrate 122, and a liquid crystal layer 123 sandwiched between the array substrate 121 and the colour film substrate 122. The LCD panel 12 controls luminance of light penetrating through each region of the LCD panel 12 by controlling a direction and/or intensity of an electric field acting on liquid crystal molecules in the liquid crystal layer 123 via the array substrate 121, so as to display an image.

In some embodiments of the present disclosure, the LCD panel is an LCD panel with a flexible printed circuit (FPC), and also referred to as FPC on glass (FOG).

Figure 2:
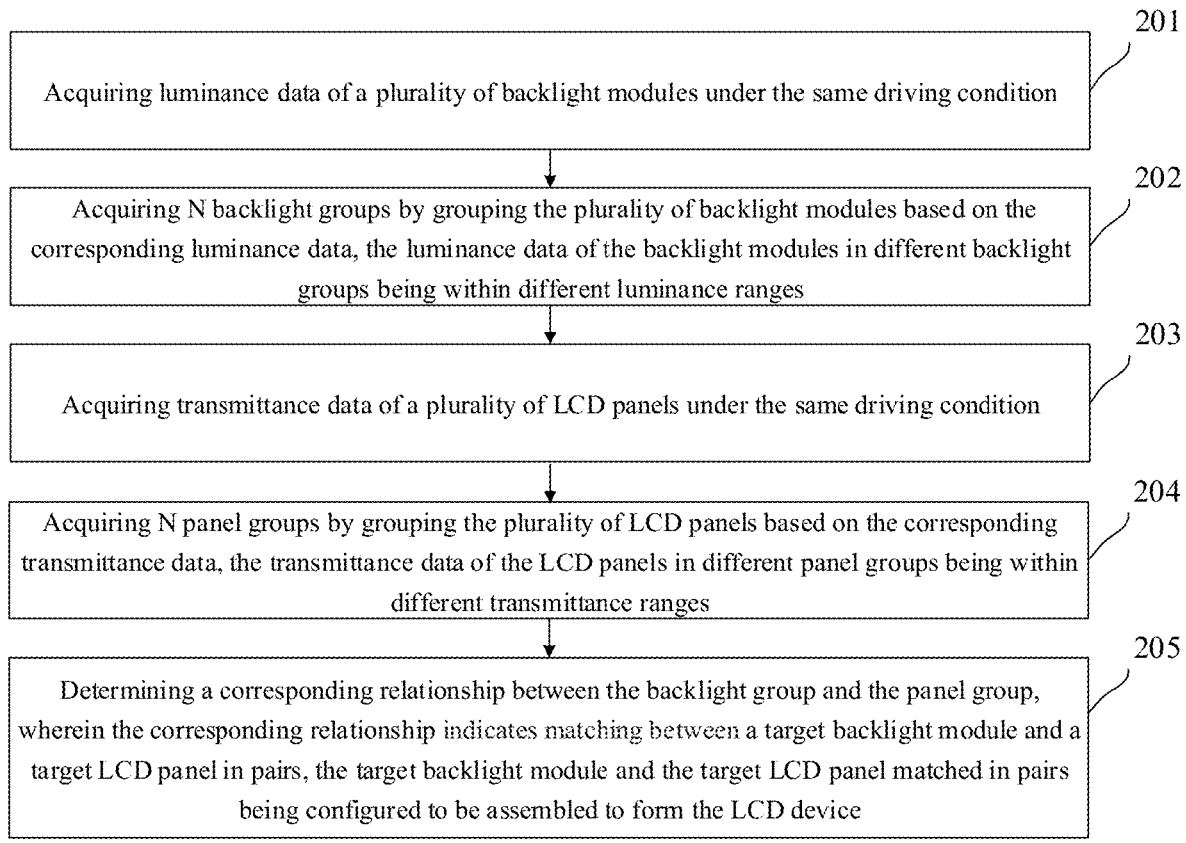
FIG. 2 is a flowchart of a matching method for manufacturing an LCD device according to an embodiment of the present disclosure.

FIG. 2 is a flowchart of a matching method for manufacturing an LCD device according to an embodiment of the present disclosure. As shown in FIG. 2, the method includes the following steps.

In step 201, luminance data of a plurality of backlight modules under the same driving condition is acquired.

In step 201, the driving condition refers to a driving voltage and/or driving current. The luminance data under the same driving condition refers to luminance data of each backlight module measured in the case of driving a plurality of backlight modules to work by adopting the same driving voltage and/or driving current.

In step 202, N backlight groups are acquired by grouping the plurality of backlight modules based on the corresponding luminance data, the luminance data of the backlight modules in different backlight groups being within different luminance ranges, wherein N is an integer greater than 1.

By step 202, a plurality of backlight modules are organized into at least two backlight groups, the luminance data of the backlight modules in the same backlight group is within the same luminance range, and the luminance data of the backlight modules in different backlight groups is within different luminance ranges. In the embodiments of the present disclosure, different luminance ranges refer to luminance ranges without an overlap portion.

In step 203, transmittance data of a plurality of LCD panels under the same driving condition is acquired.

The driving condition in step 203 refers to the driving voltage and/or driving current. The transmittance data under the same driving condition refers to transmittance data of each LCD panel measured in the case of driving a plurality of LCD panels to work by adopting the same driving voltage and/or driving current when the luminance data of the backlight modules is constant.

In step 204, N panel groups are acquired by grouping the plurality of LCD panels based on the corresponding transmittance data, the transmittance data of the LCD panels in different panel groups being within different transmittance ranges.

In some embodiments of the present disclosure, the number of panel groups is equal to the number of backlight groups. By step 204, a plurality of LCD panels are organized into at least two panel groups, the transmittance data of the LCD panels in the same panel group is within the same transmittance range, and the transmittance data of the LCD panels in different panel groups is within different transmittance ranges.

In 205, a corresponding relationship between the backlight group and the panel group is determined, wherein the corresponding relationship indicates matching between a target backlight module and a target LCD panel in pairs, and the target backlight module and the target LCD panel matched in pairs are configured to be assembled into an LCD device.

The corresponding relationship is one-to-one correspondence between the N backlight groups in a descending order of representative values of the luminance range and the N panel groups in an ascending order of representative values of the transmittance range. The target backlight module is any one of the plurality of backlight modules, and the target LCD panel is an LCD panel in the panel group corresponding to the backlight group to which the target backlight module belongs.

In an exemplary embodiment, the representative value may be an upper limit, a lower limit, a median value, and the like.

For example, in the case that N backlight groups are A1-AN respectively, the luminance range corresponding to A1 is (a0, a1), the luminance range corresponding to A2 is (a1, a2), . . . the luminance range corresponding to AN is (aN−1, aN), and a0 to aN increase successively. In the case that N panel groups are B1-BN respectively, the transmittance range corresponding to B1 is (bN−1, bN), the transmittance range corresponding to B2 is (bN-2, bN−1), . . . the transmittance range corresponding to BN is (b0, b1), and b0 to bN increase successively. Then, A1, corresponds to B1, A2 corresponds to B2 . . . and AN corresponds to BN. Thus, the backlight module in A1 is matched with the LCD panel in B1, . . . and the backlight module in AN is matched with the LCD panel in BN.

It is to be noted that, the order in which steps 201 to 202 and steps 203 to 204 are performed is not limited in the embodiments of the present disclosure, that is, the above steps may be performed successively or synchronously.

In some embodiments of the present disclosure, the luminance uniformity of the LCD device is configured to measure a difference in luminance data of a plurality of LCD devices under the same driving condition. The small difference of luminance data leads to high uniformity, and the large difference of luminance data leads to low uniformity.

In the matching method for manufacturing the LCD device, the backlight modules are grouped based on different luminance data, the LCD panels are grouped based on different transmittance data, and the N backlight groups in the descending order of representative values of the luminance range is in one-to-one correspondence with the N panel groups in the ascending order of representative values of the transmittance range, such that the corresponding relationship between the backlight group and the panel group may be determined during matching of the backlight module and the LCD panel, wherein the corresponding relationship indicates matching between the target backlight module and the target LCD panel in pairs. The target backlight module is any one of the plurality of backlight modules, and the target LCD panel is an LCD panel in the panel group corresponding to the backlight group to which the target backlight module belongs. Therefore, the backlight module with high luminance data and the LCD panel with low transmittance data are matched in pairs, the backlight module with low luminance data and the LCD panel with high transmittance data are matched in pairs, and the target backlight module and the target LCD panel matched in pairs are assembled together based on the matching result to facilitate reducing the luminance difference between the assembled LCD devices, thereby improving the luminance uniformity of the LCD devices.

A virtual reality (VR) device generally has two LCD devices that correspond to left and right eyes of a person respectively. An excessively large difference of luminance data of two LCD devices of a VR device may be easily perceived by a user, which significantly affects a use experience of the user. Therefore, requirements for luminance data uniformity of the LCD devices for the VR device are relatively high, and the LCD device manufactured by the matching method according to the embodiment of the present disclosure is particularly applicable to the VR device.

The matching method is applicable to large-scale automatic manufacturing of LCD devices. The backlight modules and the LCD panels are automatically grouped and the grouped target backlight modules and target LCD panels are matched and laminated based on the corresponding relationship between the backlight group and the panel group, thereby saving a large number of labour costs and improving a production efficiency of LCD devices.

In some examples, the number of backlight modules to be grouped is same as the number of LCD panels to be grouped. In some other examples, the number of backlight modules to be grouped is different from the number of LCD panels to be grouped.

In some examples, a ratio of the number of backlight modules in the target backlight group to the total number of backlight modules in the N backlight groups is equal to a ratio of the number of LCD panels in the target panel group to the total number of LCD panels in the N panel groups. The target backlight group is any one of the N backlight groups, and the target panel group is a panel group that is in the N panel groups and corresponds to the target backlight group.

The ratio of the number of the backlight modules in the target backlight group is same as the ratio of the number of the LCD panels in the target panel group. In this way, when the number of backlight modules is equal to the number of LCD panels, all backlight modules and LCD panels may be fully utilized; when the number of backlight modules is not equal to the number of LCD panels, the extra backlight modules are configured to be assembled with the next batch of LCD panels or the extra LCD panels are configured to be assembled with the next batch of backlight modules, so as to prevent waste of materials.

In some other examples, the ratio of the number of backlight modules in the target backlight group to the total number of backlight modules in the N backlight groups is not equal to the ratio of the number of LCD panels in the target panel group to the total number of LCD panels in the N panel groups.

The ratio of the number of backlight modules in the target backlight group to the total number of backlight modules in the N backlight groups may be made equal to the ratio of the number of LCD panels in the target panel group to the total number of LCD panels in the N panel groups in the following two grouping fashions.

In a first grouping fashion, the backlight modules and the LCD panels are grouped based on a standard normal distribution function. It is found through a large number of tests and statistics that, luminance data of a plurality of backlight modules (e.g., the same batch of backlight modules) produced in a stable production condition (e.g., the same production condition) satisfies the law of normal distribution (i.e., Gaussian distribution); transmittance data of a plurality of LCD panels (e.g., the same batch of LCD panels) produced in a stable production condition (e.g., the same production condition) also satisfies the law of normal distribution. Therefore, the backlight modules and the LCD panels may be grouped based on the standard normal distribution function.

Figure 3:
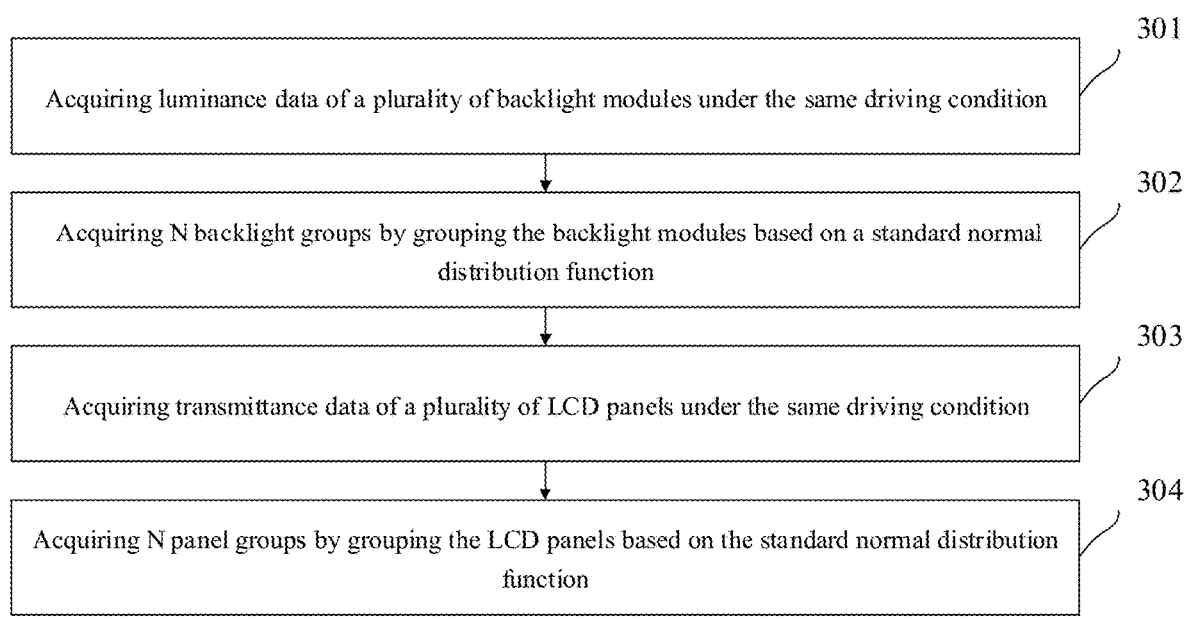
FIG. 3 is a process schematic diagram of a grouping method according to an embodiment of the present disclosure.

FIG. 3 is a process schematic diagram of a grouping method according to an embodiment of the present disclosure. As shown in FIG. 3, the process includes the following steps.

In step 301, luminance data of a plurality of backlight modules under the same driving condition is acquired.

In an exemplary embodiment, the luminance data of the plurality of backlight modules under the same driving condition may be acquired by performing a luminance test on the plurality of backlight modules with a device such as a luminance meter (e.g., BM-7A).

In step 302, N backlight modules are acquired by grouping the backlight modules based on the standard normal distribution function. The luminance data of the backlight modules in different backlight groups is within different luminance ranges, and different luminance ranges do not overlap with each other.

The normal distribution function of the luminance data of the backlight module is as follows:

$$f(x) = \frac{1}{\sqrt{2\pi}\,\sigma 1} e^{-\frac{(x-u1)^2}{2(\sigma 1)^2}}. \tag{1}$$

In formula (1), u1 is an average value of the luminance data of a plurality of backlight modules, and σ1 is a standard deviation of the luminance data of the plurality of backlight modules.

The following formula may be acquired by calculation of the normal distribution.

$$P(u1 - k\sigma 1 < x < u1 + k\sigma 1) = \int_{u1-k\sigma 1}^{u1+k\sigma 1} \frac{1}{\sqrt{2\pi}\,\sigma 1} e^{-\frac{(x-u1)^2}{2(\sigma 1)^2}} dx \tag{2}$$

Let $n = \frac{x-u}{\sigma}$, then $dx=\sigma dn$; the following formula may be acquired by converting the formula (2) into the standard normal distribution function.

$$P(-k<n<+k) = \int_{-k}^{k} \frac{1}{\sqrt{2\pi}} e^{-\frac{1}{2}n^2} dn = 2\Phi(k)-1 \quad (3)$$

The result of the function P represents a ratio of the number of qualified backlight modules to the total number of a plurality of backlight modules in the case of k$\sigma$1. In formula (3), k represents a predetermined value, and 0<k1≤3.

Based on the formula (3), the plurality of backlight modules may be grouped by calculating the ratio of the number of backlight modules within different luminance ranges to the total number of the plurality of backlight modules.

In some possible embodiments, the backlight modules may be organized into two groups or three groups by grouping the backlight modules based on the standard normal distribution function. That is, N is equal to 2 or 3. Division of two groups and division of three groups are described below respectively.

In the case that N=2, backlight modules with luminance data within a range of (u1−k1$\sigma$1, u1) are organized into a first group, and backlight modules with luminance data within a range of (u1, u1+k1 $\sigma$1) are organized into a second group, wherein u1 represents an average value of the luminance data of the backlight modules in the N backlight groups, k1 represents a predetermined value, 0<k1≤3, and $\sigma$1 represents a standard deviation of the luminance data of the backlight modules in the N backlight groups.

In an exemplary embodiment, 2≤k1≤3, for example, k1=2, or k1=2.2, or k1=3.

In the case that N=3, backlight modules with luminance data within a range of (u1−k11 $\sigma$1, u1−k12 $\sigma$1) are organized into a first group, backlight modules with luminance data within a range of (u1−k12 $\sigma$1, u1+k12 $\sigma$1) are organized into a second group, and backlight modules with luminance data within a range of (u1+k12 $\sigma$1, u1+k11 $\sigma$1) are organized into a third group, wherein u1 represents an average value of the luminance data of the backlight modules in the N backlight groups, k11 and k12 represent predetermined values, 0<k12<k11≤3, and $\sigma$1 represents a standard deviation of the luminance data of the backlight modules in the N backlight groups.

In an exemplary embodiment, 2≤k11≤3, and 0<k12<2. In some examples, k11=3, and k12=0.7.

In step 303, transmittance data of a plurality of LCD panels under the same driving condition is acquired.

In an exemplary embodiment, the transmittance data of the plurality of LCD panels under the same driving condition may be acquired by performing a transmittance test on the plurality of LCD panels with a device such as a colour analyzer (e.g., CA410).

In 304, N panel groups are acquired by grouping the LCD panels based on the standard normal distribution function. The transmittance data of the LCD panels in different panel groups is within different transmittance ranges.

The normal distribution function of the transmittance data of the LCD panel is as follows:

$$f(x) = \frac{1}{\sqrt{2\pi}\,\sigma 2} e^{-\frac{(x-u2)^2}{2(\sigma 2)^2}}. \quad (4)$$

In formula (4), u2 represents an average value of the transmittance data of a plurality of LCD panels, and $\sigma$2 represents a standard deviation of the transmittance data of the plurality of LCD panels.

The following formula may be acquired by calculation of the normal distribution.

$$P(u2-k\sigma 2 < x < u2+k\sigma 2) = \int_{u2-k\sigma 2}^{u2+k\sigma 2} \frac{1}{\sqrt{2\pi}\,\sigma 2} e^{-\frac{(x-u2)^2}{2(\sigma 2)^2}} dx \quad (5)$$

The following formula may be acquired by converting the formula (5) into the standard normal distribution function.

$$P(-k<n<+k) = \int_{-k}^{k} \frac{1}{\sqrt{2\pi}} e^{-\frac{1}{2}n^2} dn = 2\Phi(k)-1 \quad (6)$$

The result of the function P represents a ratio of the number of qualified LCD panels to the total number of a plurality of LCD panels in the case of k$\sigma$2. In formula (6), k represents a predetermined value, and 0<k1≤3.

Based on the formula (6), the plurality of LCD panels may be grouped by calculating the ratio of the number of LCD panels within different transmittance ranges to the total number of the plurality of LCD panels.

When the backlight modules are organized into two groups, the LCD panels are also organized into two groups. In this case, LCD panels with transmittance data within a range of (u2−k2 $\sigma$2, u2) are organized into a first group, and LCD panels with transmittance data within a range of (u2, u2+k2 $\sigma$2) are organized into a second group, wherein u2 represents an average value of the transmittance data of the LCD panels in the N panel groups, k2=k1, and $\sigma$2 represents a standard deviation of the transmittance data of the LCD panels in the N panel groups.

When the backlight modules are organized into three groups, the LCD panels are also organized into three groups. In this case, LCD panels with transmittance data within a range of (u2−k21$\sigma$2, u2−k22 $\sigma$2) are organized into a first group, LCD panels with transmittance data within a range of (u2−k22 $\sigma$2, u2+k22 $\sigma$2) are organized into a second group, and LCD panels with transmittance data within a range of (u+k22$\sigma$, u+k21$\sigma$) are organized into a third group, wherein u2 is an average value of the transmittance data of the LCD panels in N panel groups, k11=k21, k12=k22, and $\sigma$2 represents a standard deviation of the transmittance data of the LCD panels in N panel groups.

In a second grouping fashion, the backlight modules or LCD panels are grouped according to a predetermined group number and a predetermined ratio.

Figure 4:
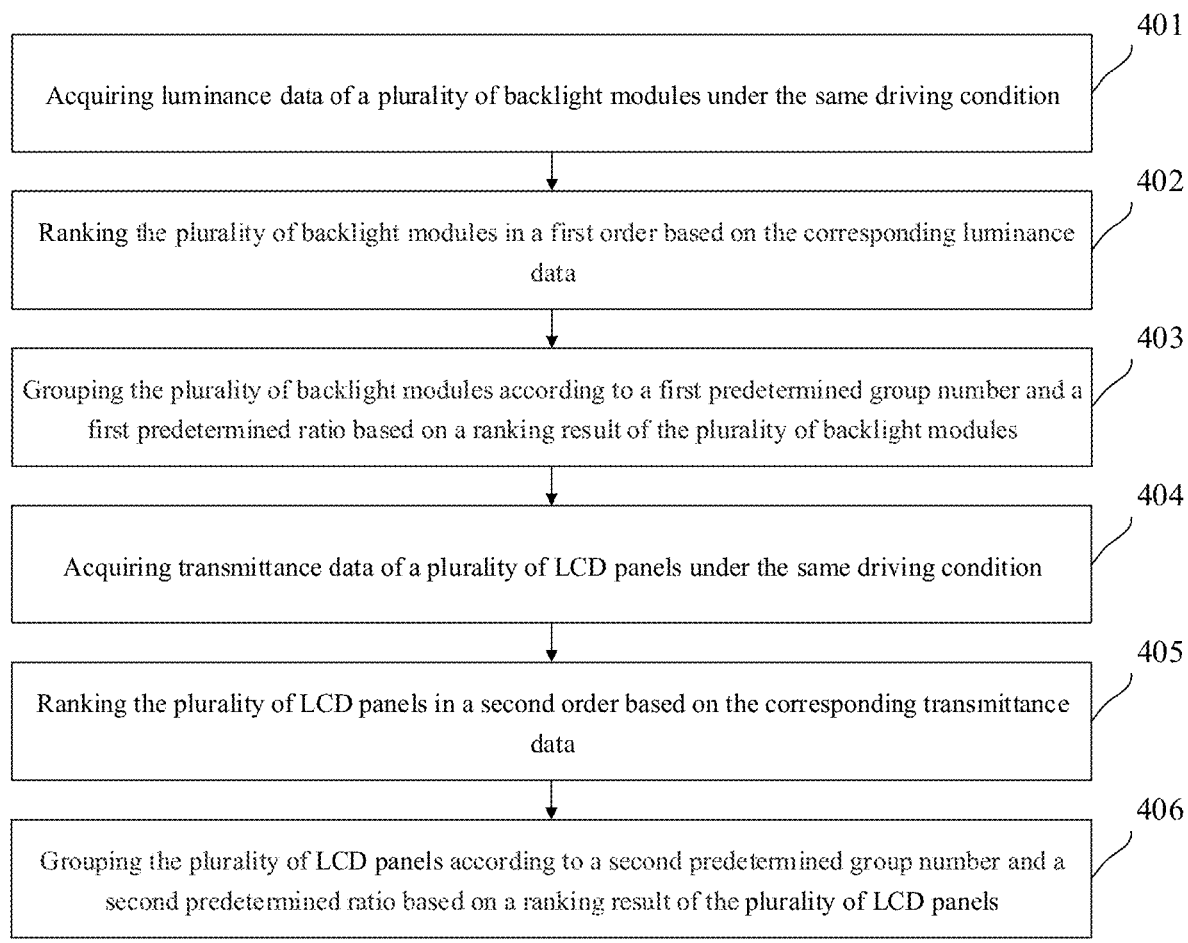
FIG. 4 is a process schematic diagram of another grouping method according to an embodiment of the present disclosure.

FIG. 4 is a process schematic diagram of another grouping method according to an embodiment of the present disclosure. As shown in FIG. 4, the process includes the following steps.

In step 401, luminance data of a plurality of backlight modules under the same driving condition is acquired.

In step 402, the plurality of backlight modules are ranked in a first order based on the luminance data.

The first order is a descending order or an ascending order.

In step 403, the plurality of backlight modules are grouped according to a first predetermined group number and a first predetermined ratio based on a ranking result of the plurality of backlight modules.

The first predetermined group number is the number of backlight groups, and the first predetermined ratio is a number ratio of the backlight modules in each two groups of the backlight groups.

In an exemplary embodiment, step 403 includes:

firstly, determining the number of backlight modules in the corresponding backlight group based on the first predetermined ratio and the total number of a plurality of backlight modules; and secondly, continuously selecting the corresponding number of backlight modules as a backlight group based on the ranking result.

For example, in the case that the number of backlight modules is 100, the first order is descending, the first predetermined group number is two groups, and the first predetermined ratio is 1:1, the number of backlight modules in each backlight group is 50. Then, in the ranking result, the $1^{st}$ to $50^{th}$ backlight modules are organized into the first backlight group, and the $51^{st}$ to $100^{th}$ backlight modules are organized into the second backlight group.

By steps 401 to 403, N backlight groups are acquired by grouping a plurality of backlight modules based on the luminance data under the same driving condition, and the luminance data of the backlight modules in different backlight groups is within different luminance ranges.

In step 404, transmittance data of a plurality of LCD panels under the same driving condition is acquired.

In step 405, the plurality of LCD panels are ranked in a second order based on the corresponding transmittance data.

The second order is reverse to the first order. For example, when the first order is ascending, the second order is descending. For another example, when the first order is descending, the second order is ascending.

In step 406, the plurality of LCD panels are grouped according to a second predetermined group number and a second predetermined ratio based on a ranking result of the plurality of LCD panels.

The second predetermined group number is the number of panel groups, the second predetermined ratio is a number ratio of the LCD panels in each two groups of the panel groups, the second predetermined group number is equal to the first predetermined group number, and the second predetermined ratio is equal to the first predetermined ratio.

Step 406 includes: firstly, determining the number of LCD panels in the corresponding panel group based on the second predetermined ratio and the total number of a plurality of LCD panels; and secondly, continuously selecting the corresponding number of LCD panels as a panel group based on the ranking result.

By steps 404 to 406, N panel groups are acquired by grouping the plurality of LCD panels based on the transmittance data under the same driving condition, and the transmittance data of the LCD panels in different panel groups is within different transmittance ranges.

It is to be noted that, the order in which steps 401 to 403 and steps 404 to 406 are performed is not limited in the embodiments of the present disclosure, that is, the above steps may be performed successively or synchronously.

Optionally, in some embodiments of the present disclosure, the matching method further includes any of the followings: removing backlight modules with luminance data exceeding a predetermined luminance data range from a plurality of backlight modules prior to grouping the plurality of backlight modules; or removing LCD panels with transmittance data exceeding a predetermined transmittance data range from a plurality of LCD panels prior to grouping the plurality of LCD panels.

Luminance fluctuation of the LCD device is superimposed by luminance fluctuation of the adopted backlight module and transmittance fluctuation of the adopted LCD panel. Thus, the excessively large luminance fluctuation of the backlight module or transmittance fluctuation of the LCD panel may result in poor uniformity of the LCD device. By removing the backlight modules with the luminance data exceeding the predetermined luminance data range from a plurality of backlight modules prior to grouping the plurality of backlight modules or removing the LCD panels with the transmittance data exceeding the predetermined transmittance data range from a plurality of LCD panels prior to grouping the plurality of LCD panels, the luminance fluctuation of the backlight modules to be matched or the transmittance fluctuation of the LCD panels to be matched may be reduced, thereby improving the luminance uniformity of LCD devices matched thereinto. Further, it is conducive to improving a production yield of the LCD device.

Optionally, the predetermined luminance data range is (u1−k1 σ1, u1+k1 σ1), wherein u1 represents an average value of the luminance data of all backlight modules, σ1 represents a standard deviation of the luminance data of all backlight modules, and 2≤k1≤3.

Optionally, the predetermined transmittance data range is (u2−k2σ2, u2+k2 σ2), wherein u2 represents an average value of the transmittance data of all LCD panels, σ2 represents a standard deviation of the transmittance data of all LCD panels, and 2≤k2≤3.

It is to be noted that, in the case that it is required to remove the backlight module and the LCD panel at the same time, k1=k2.

Figure 5:
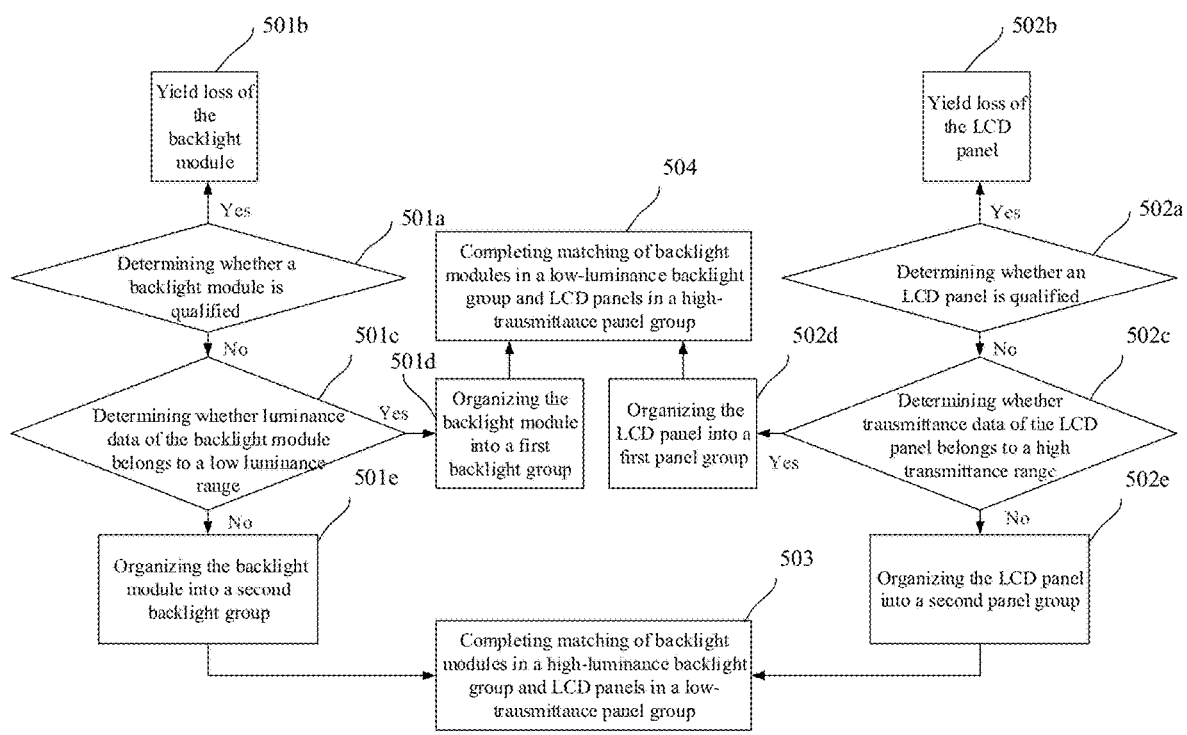
FIG. 5 is a flowchart of a 2-group matching solution according to an embodiment of the present disclosure.

The above step may be combined with any of the grouping methods in FIG. 3 to FIG. 5.

It is to be noted that, in the case of small fluctuation of the luminance data of the backlight modules, for example, the fluctuation of the luminance data is less than 10%, it is unnecessary to perform the above step on the backlight modules.

FIG. 5 is a flowchart of a 2-group matching solution according to an embodiment of the present disclosure. As shown in FIG. 5, the process includes the following steps.

In step 501*a*, whether a backlight module is qualified, that is, whether luminance data of the backlight module exceeds a predetermined luminance data range is determined. In the case that the backlight module is unqualified (that is, the luminance data exceeds the predetermined luminance data range), step 501*b* is performed; and in the case that the backlight module is qualified (that is, the luminance data does not exceed the predetermined luminance data range), step 501*c* is performed.

In step 501*b*, the unqualified backlight module is determined as a yield loss of the backlight module, and the current process is exited.

In step 501*c*, whether the luminance data of the backlight module belongs to a low luminance range is determined. In the case that the luminance data of the backlight module belongs to the low luminance range, step 501*d* is performed; and in the case that the luminance data of the backlight module does not belong to the low luminance range, step 501*e* is performed.

In step 501*d*, the backlight module is organized into a first backlight group (low-luminance backlight group).

In step 501*e*, the backlight module is organized into a second backlight group (high-luminance backlight group).

In step 502*a*, whether an LCD panel is qualified, that is, whether transmittance data of the LCD panel exceeds a predetermined transmittance data range is determined. In the case that the LCD panel is unqualified (that is, the transmittance data exceeds the predetermined transmittance data range), step 502*b* is performed; and in the case that the LCD panel is qualified (that is, the transmittance data does not exceed the predetermined transmittance data range), step 502*c* is performed.

In step 502*b*, the unqualified LCD panel is determined as a yield loss of the LCD panel, and the current process is exited.

In step 502*c*, whether the transmittance data of the LCD panel belongs to a high transmittance range is determined. In the case that the transmittance data of the LCD panel belongs to the high transmittance range, step 502*d* is performed; and in the case that the transmittance data of the LCD panel does not belong to the high luminance range, step 502*e* is performed.

In step 502*d*, the LCD panel is organized into a first panel group (high-transmittance panel group).

In step 502*e*, the LCD panel is organized into a second panel group (low-transmittance panel group).

In step 503, the backlight modules in the high-luminance backlight group are matched with the LCD panels in the low-transmittance panel group.

In step 504, the backlight modules in the low-luminance backlight group are matched with the LCD panels in the high-transmittance panel group.

It is to be noted that, steps 501*a* to 501*e* and steps 502*a* to 502*e* are performed simultaneously.

Figure 6:
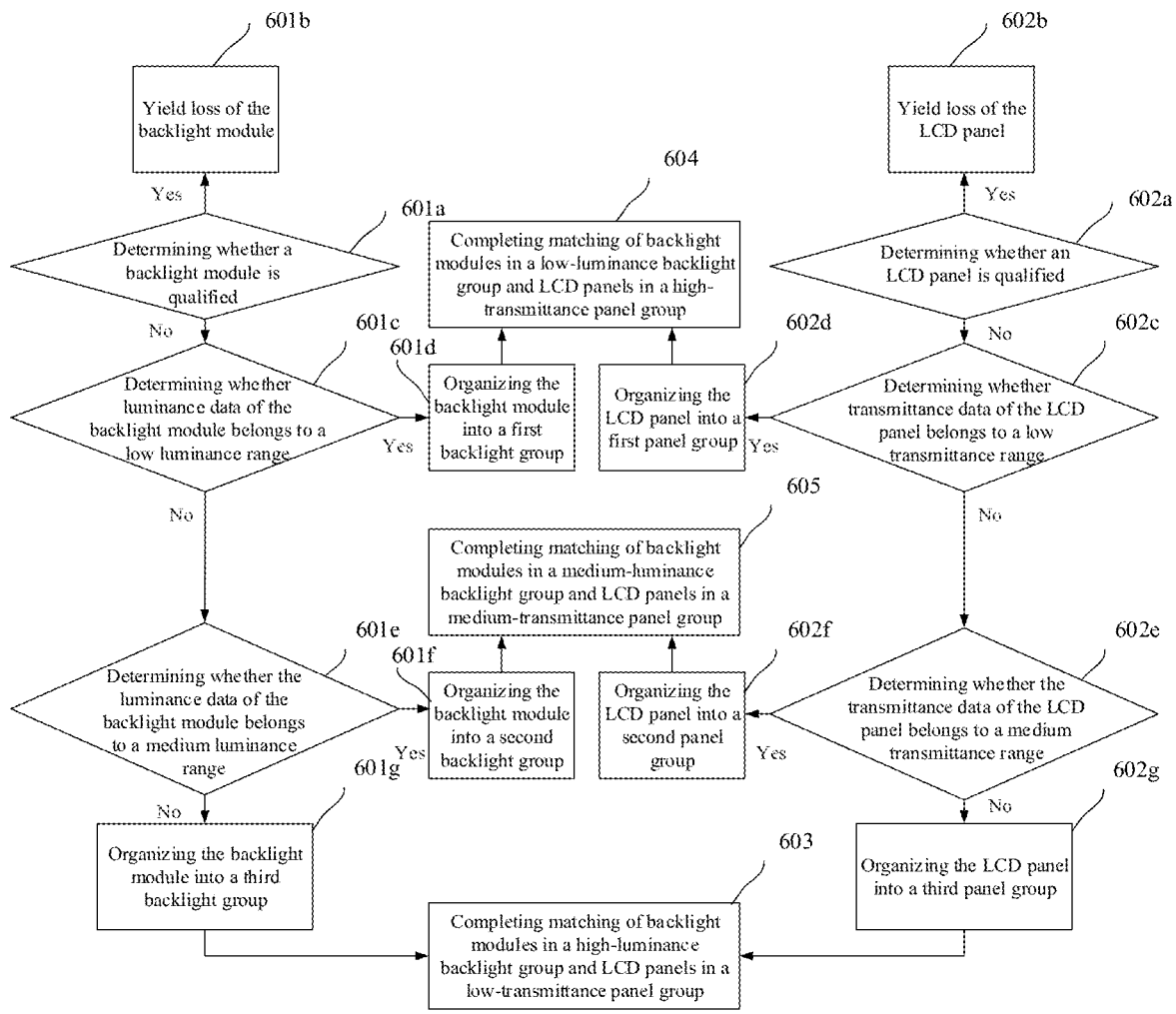
FIG. 6 is a flowchart of a 3-group matching solution according to an embodiment of the present disclosure.

FIG. 6 is a flowchart of a 3-group matching solution according to an embodiment of the present disclosure. As shown in FIG. 6, the matching includes the following steps.

In step 601*a*, whether a backlight module is qualified, that is, whether luminance data of the backlight module exceeds a predetermined luminance data range is determined. In the case that the backlight module is unqualified (that is, the luminance data exceeds the predetermined luminance data range), step 601*b* is performed; and in the case that the backlight module is qualified (that is, the luminance data does not exceed the predetermined luminance data range), step 6011*c* is performed.

In step 601*b*, the unqualified backlight module is determined as a yield loss of the backlight module, and the current process is exited.

In step 601*c*, whether the luminance data of the backlight module belongs to a low luminance range is determined. In the case that the luminance data of the backlight module belongs to the low luminance range, step 601*d* is performed; and in the case that the luminance data of the backlight module does not belong to the low luminance range, step 601*e* is performed.

In step 601*d*, the backlight module is organized into a first backlight group (low-luminance backlight group).

In step 601*e*, whether the luminance data of the backlight module belongs to a medium luminance range is determined. In the case that the luminance data of the backlight module belongs to the medium luminance range, step 601*f* is performed; and in the case that the luminance data of the backlight module does not belong to the medium luminance range, step 601*g* is performed.

In step 601*f*, the backlight module is organized into a second backlight group (medium-luminance backlight group).

In step 601*g*, the backlight module is organized into a third backlight group (high-luminance backlight group).

In step 602*a*, whether an LCD panel is qualified, that is, whether transmittance data of the LCD panel exceeds a predetermined transmittance data range is determined. In the case that the LCD panel is unqualified (that is, the transmittance data exceeds the predetermined transmittance data range), step 602*b* is performed; and in the case that the LCD panel is qualified (that is, the transmittance data does not exceed the predetermined transmittance data range), step 602*c* is performed.

In step 602*b*, the unqualified LCD panel is determined as a yield loss of the LCD panel, and the current process is exited.

In step 602*c*, whether the transmittance data of the LCD panel belongs to a high transmittance range is determined. In the case that the transmittance data of the LCD panel belongs to the high transmittance range, step 602*d* is performed; and in the case that the transmittance data of the LCD panel does not belong to the high transmittance range, step 602*e* is performed.

In step 602*d*, the LCD panel is organized into a first panel group (high-transmittance panel group).

In step 602*e*, whether the transmittance data of the LCD panel belongs to a medium-transmittance range is determined. In the case that the transmittance data of the LCD panel belongs to the medium-transmittance range, step 602*f* is performed; and in the case that the transmittance data of the LCD panel does not belong to the medium-transmittance range, step 602*g* is performed.

In step 602*f*, the LCD panel is organized into a second panel group (medium-transmittance panel group).

In step 602*g*, the LCD panel is organized into a third panel group (low-transmittance panel group).

In step 603, the backlight modules in the high-luminance backlight group are matched with the LCD panels in the low-transmittance panel group.

In step 604, the backlight modules in the low-luminance backlight group are matched with the LCD panels in the high-transmittance panel group.

In step 605, the backlight modules in the medium-luminance backlight group are matched with the LCD panels in the medium-transmittance panel group.

It is to be noted that, steps 601*a* to 601*g* and steps 602*a* to 602*g* are performed simultaneously.

Effects of the embodiments of the present disclosure are described below by specific examples.

Example 1

Firstly, the luminance of the backlight module is tested by using BM-3A.
1) Preparation Work Prior to Test
  a) An instrument is focused as follows: a measuring angle is adjusted to 2°; a focusing ring of an eye lens is adjusted while observing the eye lens; the adjustment is stopped when a measuring point (a black spot in the eye lens) seen in the eye lens is the clearest; a focusing ring of an object lens is adjusted while observing an object to be measured in the eye lens; the adjustment is stopped when the object to be measured is the clearest; and the test is performed by selecting an appropriate measuring angle (e.g., 1°).

b) The instrument is powered on: a power switch on the instrument is turned on, the instrument enters a warm-up state, and the warm-up time generally is fifteen minutes.

c) A mode is selected: the instrument is connected to a computer in a remote mode to transmit the measured data to a measuring software in the computer.

Figure 7:
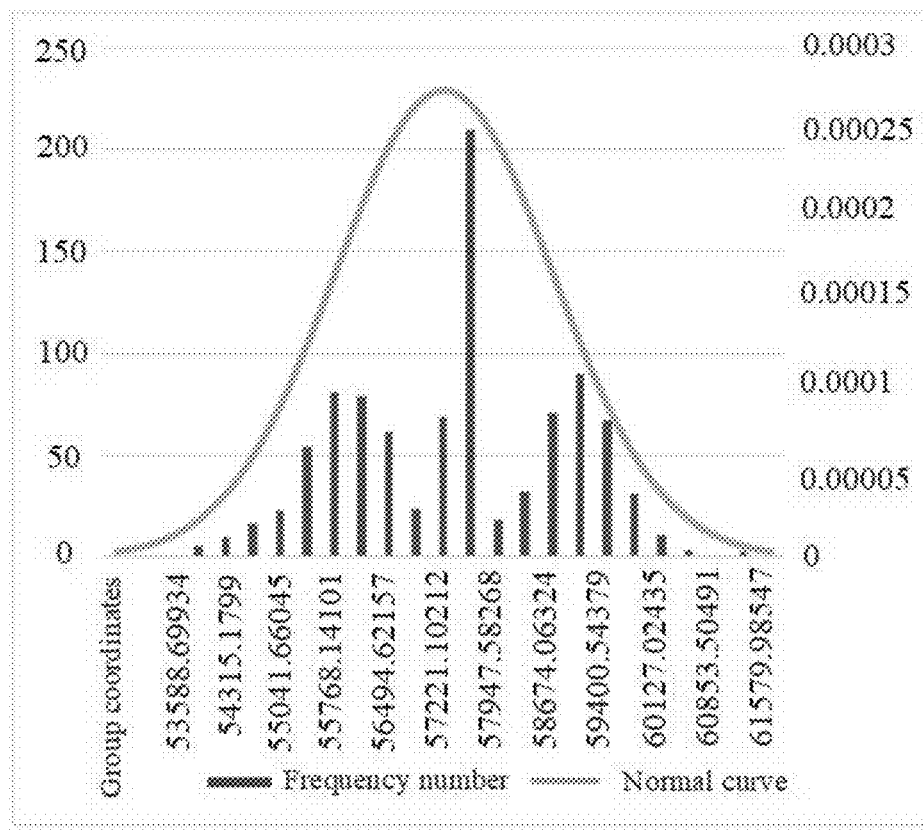
FIG. 7 is a distribution curve diagram of a test result of luminance data of backlight modules in an example according to an embodiment of the present disclosure.

2) Data Measurement a) The instrument enters an automatic measurement state, and transmits the measured luminance data of the backlight module to the computer.

b) The computer performs fitting based on the received data, and acquires a test result as shown in FIG. 7.

In FIG. 7, the abscissa represents luminance data of backlight modules, the ordinate on the left refers to a group number of the backlight modules, and the ordinate on the right refers to values of normal distribution density functions. It may be seen from FIG. 7 that the distribution of the luminance data of a plurality of backlight modules conforms to the normal distribution. The fluctuation of the luminance data of the backlight modules is less than 10%.

Secondly, the transmittance data of the LCD panel is tested by using CA410.

1) Preparation Work Prior to Test a) Backlight modules are screened and calibrated as follows: the luminance data of the backlight modules under different driving currents is determined by selecting at least three standard backlight modules, and the current required for the transmittance test is selected according to actual requirements. For example, the luminance data of the backlight module is tested every other 5 mA within 20 mA to 40 mA.

b) The CA410 is calibrated: optical calibration is performed on the CA410 based on the calibrated data of the LCD panel to ensure consistency of optical standards.

Figure 8:
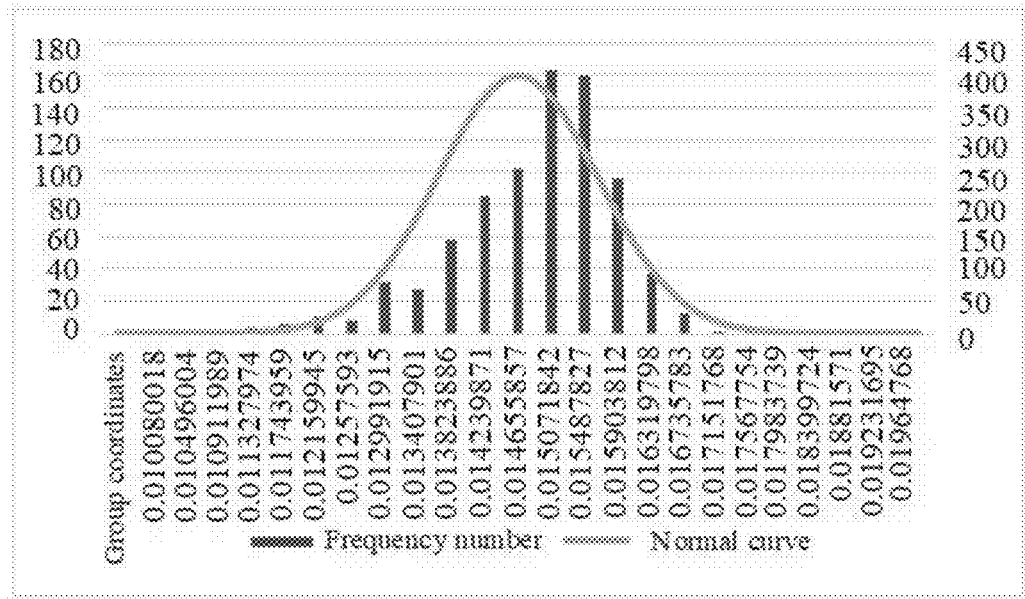
FIG. 8 is a distribution curve diagram of a test result of transmittance data of LCD panels in an example according to an embodiment of the present disclosure.

2) Data Measurement a) The instrument enters an automatic measurement state, and transmits the measured luminance data of the LCD panel to the computer.

b) The computer performs fitting based on a ratio of the luminance data of the LCD panel to the luminance data of the standard backlight module, and acquires a test result as shown in FIG. 8.

In FIG. K, the abscissa represents transmittance data of LCD panels, the ordinate on the left refers to a group number of the LCD panels, and the ordinate on the right refers to values of normal distribution density functions. It may be seen from FIG. 8 that the distribution of the transmittance data of a plurality of LCD panels conforms to the normal distribution. The fluctuation of the transmittance data of the LCD panels is greater than 10%, and is about 30%.

Thirdly, let k=2.2, and the LCD panels exceeding a range of (u−2.2σ, u+2.2σ) are removed.

In this example, the total number of tested LCD panels is 559. By calculation, the average value u of the transmittance data is 1.51%, and the standard deviation a of the transmittance data is 0.1%. That is, the LCD panels beyond a range of (1.29%, 1.72%) are removed. Six LCD panels are actually removed, and the actual yield is 1−6/559=98.9%. The yield of the LCD panel calculated based on the standard normal function is 98.49%.

It is to be noted that, in this example, it is not required to remove the backlight modules since the fluctuation of the luminance data of the backlight modules is less than 10%.

Fourthly, the backlight modules are organized into two backlight groups based on different luminance data, the first backlight group is (min, u) (53894, 57000), and the second backlight group is (u, max)=(57000, 61581); the LCD panels are organized into two panel groups based on different transmittance data, the first panel group is (u−k1σ, u)=(1.29%, 1.51%), and the second panel group is (u, u+k1σ)=(1.51%, 1.73%); the backlight modules in the first backlight group and the LCD panels in the second panel group are laminated and assembled, and the backlight modules in the second backlight group and the LCD panels in the first panel group are laminated and assembled.

The first panel group includes 277 LCD panels, and the second panel group includes 276 LCD panels.

In the same test condition, the LCD devices acquired by the method according to the embodiment of the present disclosure and the LCD devices acquired by random assembly are tested, and the test result is as shown in the following Table 1.

TABLE 1

| Luminance index | Not matching (228 pcs) | Matching (373 pcs) |
| --- | --- | --- |
| Uniformity | 80.36% | 82.34% |
| Fluctuation | −23.53%, 14.2% | −21.7%, 11.84% |
| 10% fluctuation yield | 88.60% | 92.23% |
| 20% fluctuation yield | 99.12% | 99.73% |

In Table 1, a lower limit of the fluctuation refers to a ratio of a difference between a minimum value of luminance data of all LCD devices and an average value of luminance data of all LCD devices to an average value of the luminance data; a representative value of fluctuation refers to a ratio of a difference between a maximum value of luminance data of all LCD devices and the average value of luminance data of all LCD devices to the average value of the luminance data. An X % fluctuation yield refers to a yield of the LCD device in the case of allowing to fluctuate by X % (that is, the LCD devices with fluctuation values less than −X % and greater than X % are all considered to be defective).

It may be seen from Table 1 that, the uniformity of the LCD devices acquired by the method according to the embodiment of the present disclosure and the LCD devices acquired by random assembly, the fluctuation of the luminance data range and the fluctuation yield of the luminance data are all improved.

Example 2

Firstly, the luminance of the backlight module is tested by using BM-3A.

Figure 9:
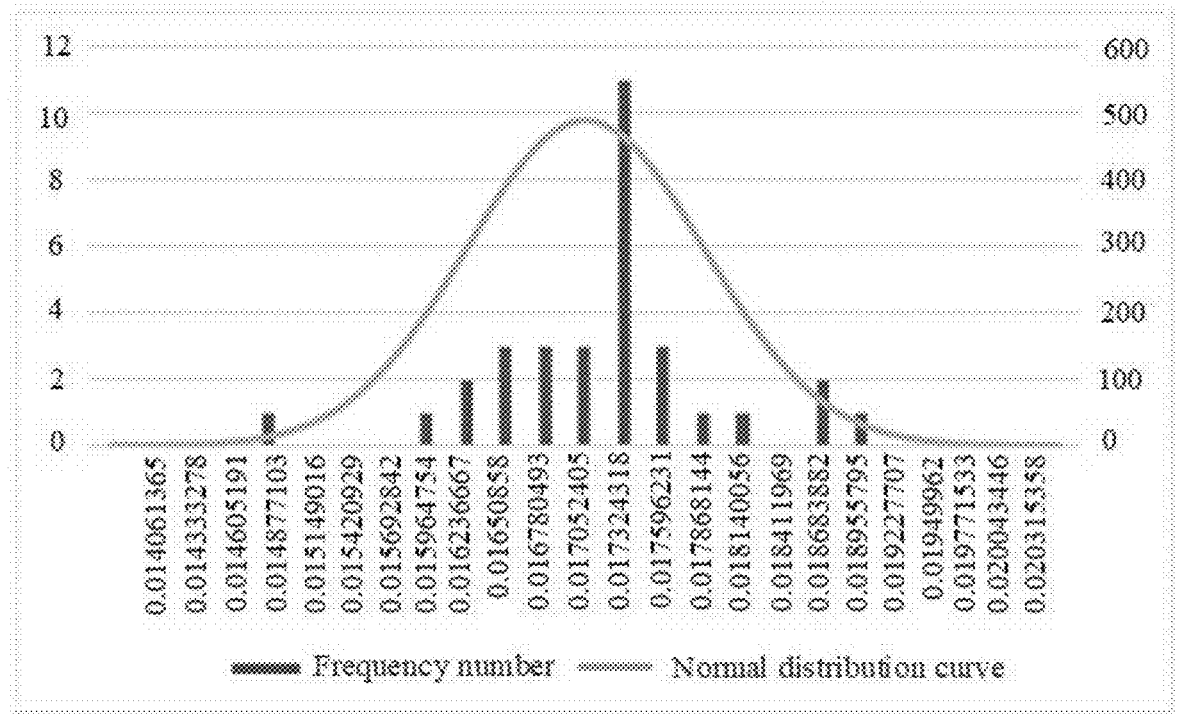
FIG. 9 is a distribution curve diagram of a test result of luminance data of backlight modules in another example according to an embodiment of the present disclosure.

For the test condition, reference is made to example 1, and the acquired test result is as shown in FIG. 9. The average value of the luminance data of the backlight module is 28266 nit, and the fluctuation range is +/−10.

Secondly, the transmittance of the LCD panel is tested by using CA410.

Figure 10:
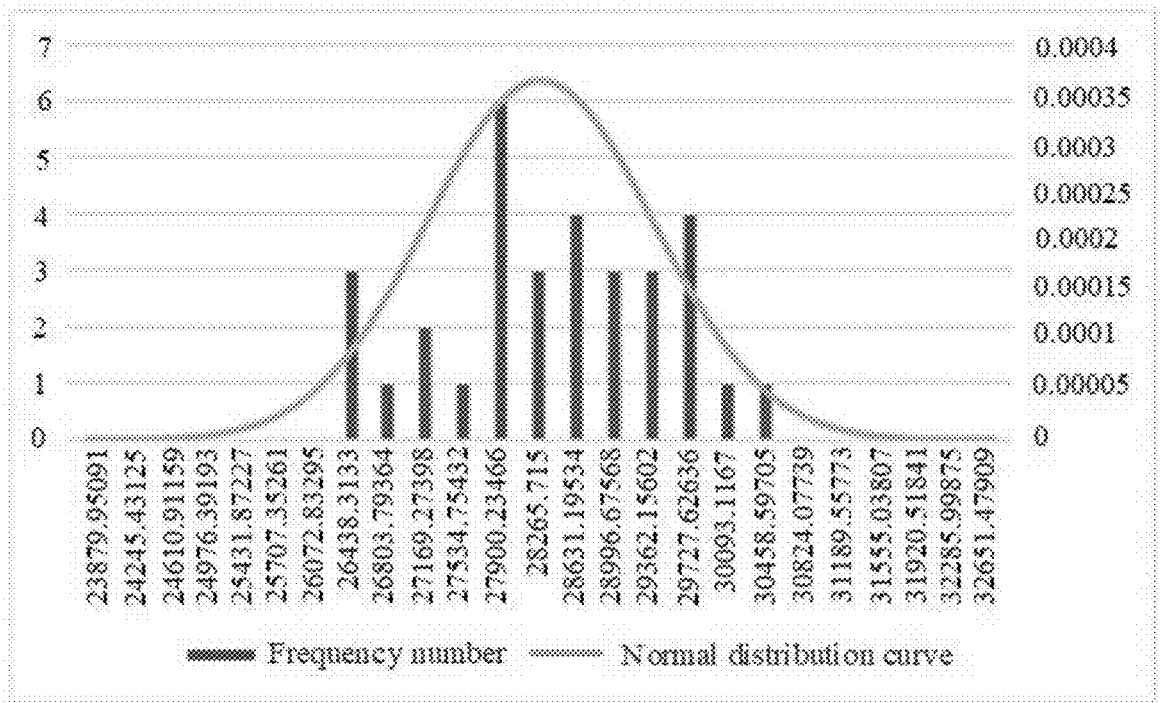
FIG. 10 is a distribution curve diagram of a test result of transmittance data of LCD panels in another example according to an embodiment of the present disclosure.

For the test condition, reference is made to example 1, and the acquired test result is as shown in FIG. 10. The average value of the transmittance data of the LCD panel is 1.73%, and the fluctuation range is +/−30.

Thirdly, the LCD panels exceeding a range of (u−3σ, u+3σ) are removed. The yield of the LCD panel is 99.74%.

It is to be noted that, in this example, it is not required to remove the backlight modules due to small fluctuation of the luminance data of the backlight modules.

Fourthly, matching solution 1 is described below.

The backlight modules with the luminance data within the range of (u1−k11 σ1, u1−k12 σ1) are organized into the low-luminance backlight group, the backlight modules with the luminance data within the range of (u1−k12 σ1, u1+k12

σ1) are organized into the medium-luminance backlight group, and the backlight modules with the luminance data within the range of (u1+k12 σ1, u1+k11 σ1) are organized into the high-luminance backlight group, wherein u1 represents the average value of the luminance data of the backlight modules, k11 and k12 represent predetermined values, 0<k12<k11≤3, and σ1 represents the standard deviation of the luminance data of the backlight modules.

The LCD panels with the transmittance data within the range of (u2−k21 σ2, u2−k22 σ2) are organized into the low-transmittance panel group, the LCD panels with the transmittance data within the range of (u2−k22 σ2, u2+k22 σ2) are organized into the medium-transmittance panel group, and the LCD panels with the transmittance data within the range of (u2+k22σ, u2+k21σ) are organized into the high-transmittance panel group, wherein u2 represents the average value of the transmittance data of the LCD panels, k11=k21, k12=k22, and σ2 represents the standard deviation of the transmittance data of the LCD panels.

The grouped backlight modules and LCD panels are matched by a method of high to low, medium to medium, and low to high.

Matching solution 2 is described below.

The backlight modules with the luminance data within the range of (u1−k1 σ1, u1) are organized into the low-luminance backlight group, and the backlight modules with the luminance data within the range of (u1, u1+k1 σ1) are organized into the high-luminance backlight group.

The LCD panels with the transmittance data within the range of (u2−k2 σ2, u2) are organized into the low-transmittance panel group, and the LCD panels with the transmittance data within the range of (u2, u2+k2 σ2) are organized into the high-transmittance panel group.

The grouped backlight modules and LCD panels are matched by a method of high to low and low to high, wherein k1=k2=2 or k1=k2=3.

In the same test condition, the LCD devices acquired by the method according to the embodiment of the present disclosure and the LCD devices acquired by random assembly are tested, and the test result is as shown in the following Table 2.

TABLE 2

|  | No grouping | Three groups k12 = k22 = 0.7, k11 = k21 = 3 | Two groups k1 = k2 = 2 | Two groups k1 = k2 = 3 |
| --- | --- | --- | --- | --- |
| Luminance data range | 414.06 543.37 | 486.95 526.74 | 466.3 526.74 | 466.3 543.37 |
| Uniformity | 81.58% | 93.37% | 88.93% | 87.64% |
| Panel yield loss | 0.00% | 0.26% | 4.56% | 0.26% |

In Table 2, the uniformity is 1−3σ/Ave, wherein σ is a standard deviation of the luminance data of all LCD devices, and Ave is an average value of the luminance data of all LCD devices.

The panel yield loss refers to a ratio of the number of LCD panels with the transmittance data exceeding the predetermined transmittance data range to the total number of all LCD panels; since the LCD panels are not screened in a random combination method without grouping, the panel yield loss is 0%.

It may be seen from Table 2 that, regardless of division of three groups or two groups, the luminance uniformity of the LCD devices is apparently better than that of the LCD devices without grouping.

Figure 11:
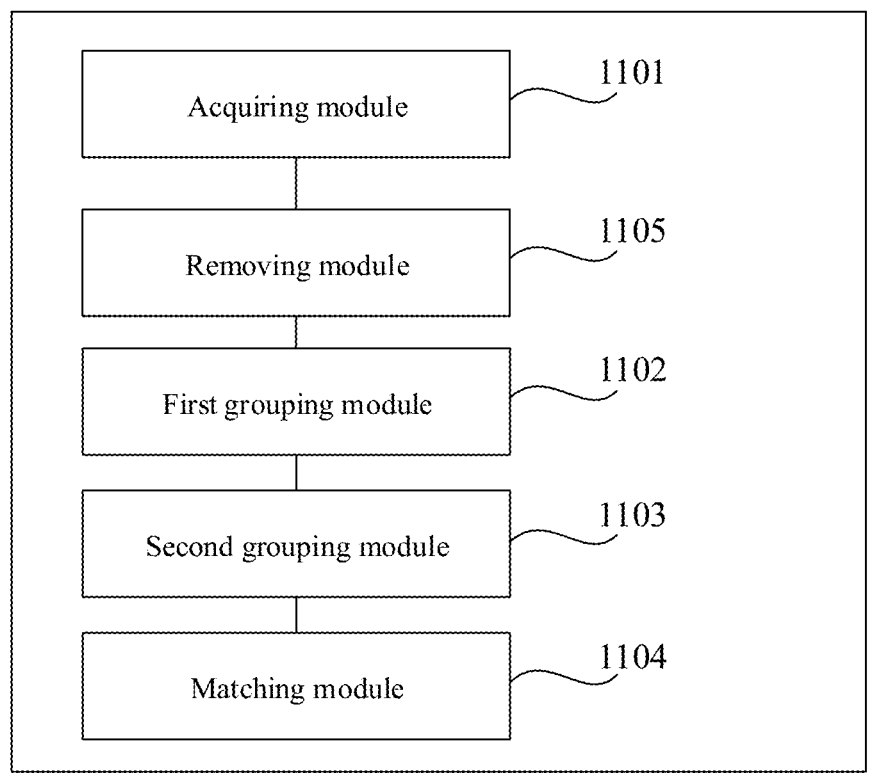
FIG. 11 is a structural schematic diagram of a matching apparatus for manufacturing an LCD device according to an embodiment of the present disclosure.

Embodiments of the present disclosure further provide a matching apparatus for manufacturing an LCD device. FIG. 11 is a structural schematic diagram of a matching apparatus for manufacturing an LCD device according to an embodiment of the present disclosure. As shown in FIG. 11, the matching apparatus includes an acquiring module 1101, a first grouping module 1102, a second grouping module 1103 and a matching module 1104.

The acquiring module 1101 is configured to acquire luminance data of a plurality of backlight modules under the same driving condition and transmittance data of a plurality of LCD panels under the same driving condition. The first grouping module 1102 is configured to acquire N backlight groups by grouping the plurality of backlight modules based on the corresponding luminance data, the luminance data of the backlight modules in different backlight groups being within different luminance ranges. The second grouping module 1103 is configured to acquire N panel groups by grouping the plurality of LCD panels based on the corresponding transmittance data, the transmittance data of the LCD panels in different panel groups being within different transmittance ranges. The matching module 1104 is configured to determine a corresponding relationship between the backlight group and the panel group, wherein the corresponding relationship indicates matching between a target backlight module and a target LCD panel in pairs, and indicates one-to-one correspondence between the N backlight groups in a descending order of representative values of the luminance range and the N panel groups in an ascending order of representative values of the transmittance range, the target backlight module is any one of the plurality of backlight modules, the target LCD panel is an LCD panel in the panel group corresponding to the backlight group to which the target backlight module belongs, and the target backlight module and the target LCD panel matched in pairs are configured to be assembled into an LCD device, wherein N is an integer greater than 1.

In some possible embodiments of the present disclosure, a ratio of the number of backlight modules in the target backlight group to the total number of backlight modules in the N backlight groups is equal to a ratio of the number of LCD panels in the target panel group to the total number of LCD panels in the N panel group.

In some possible embodiments of the present disclosure, a distribution of the luminance data of the plurality of backlight modules satisfies a normal distribution, and the first grouping module 1102 is configured to group the plurality of backlight modules based on a standard normal distribution function; and a distribution of the transmittance data of the plurality of LCD panels satisfies the normal distribution, and the second grouping module 1103 is configured to group the plurality of LCD panels based on the standard normal distribution function.

Optionally, in the case that N=2, the first grouping module 1102 is configured to organize backlight modules with luminance data within a range of (u1−k1 σ1, u1) into a first group and organize back-light modules with luminance data within a range of (u1, u1+k1σ1) into a second group, wherein u1 is an average value of the luminance data of the backlight modules in the N backlight groups, k1 represents a predetermined value, 0<k1≤3, and a represents a standard deviation of the luminance data of the backlight modules in the N backlight groups; and the second grouping module 1103 is configured to organize LCD panels with transmittance data within a range of (u2−k2 σ2, u2) into a first group and organize LCD panels with transmittance data within a range of (u2, u2+k2 σ2) into a second group, wherein u2 represents an average value of the transmittance data of the LCD panels in the N panel groups, k2=k1, and σ2 represents a standard deviation of the transmittance data of the LCD panels in the N panel groups.

Optionally, 2≤k1≤3.

Optionally, in the case that N=3, the first grouping module 1102 is configured to organize backlight modules with luminance data within a range of (u1−k11 σ1, u1−k12 σ1) into a first group, organize backlight modules with luminance data within a range of (u1−k12 σ1, u1+k12 σ1) into a second group, and organize backlight modules with luminance data within a range of (u1+k12 σ1, u1+k11 σ1) into a third group, wherein u1 represents an average value of the luminance data of the backlight modules in the N backlight groups, k11 and k12 represent predetermined values, 0<k12<k11≤3, and σ1 represents a standard deviation of the luminance data of the backlight modules in the N backlight groups; and the second grouping module 1103 is configured to organize LCD panels with transmittance data within a range of (u2−k21 σ2, u2−k22 σ2) into a first group, organize LCD panels with transmittance data within a range of (u2−k22 σ2, u2+k22 σ2) into a second group, and organize LCD panels with transmittance data within a range of (u+k22σ, u+k21σ) into a third group, wherein u2 represents an average value of the transmittance data of the LCD panels in the N panel groups, k11=k21, k12=k22, and σ2 represents a standard deviation of the transmittance data of the LCD panels in the N panel groups.

Optionally, 2≤k11≤3, and 0<k12<2.

In some other possible embodiments of the present disclosure, the first grouping module 1102 is configured to rank the plurality of backlight modules in a first order based on the corresponding luminance data, the first order being one of a descending order and an ascending order; and group the plurality of backlight modules according to a first predetermined group number and a first predetermined ratio based on a ranking result of the plurality of backlight modules, wherein the first predetermined group number is the number of the backlight groups, and the first predetermined ratio is a number ratio of the backlight modules in each two groups of the backlight groups.

The second grouping module 1103 is configured to rank the plurality of LCD panels in a second order based on the corresponding transmittance data, the second order being the other of the descending order and the ascending order; and group the plurality of LCD panels according to a second predetermined group number and a second predetermined ratio based on a ranking result of the plurality of LCD panels, wherein the second predetermined group number is the number of the panel groups, the second predetermined ratio is a number ratio of the LCD panels in each two groups of the panel groups, the second predetermined group number is equal to the first predetermined group number, and the second predetermined ratio is equal to the first predetermined ratio.

Optionally, the matching apparatus further includes a removing module 1105. The removing module 1105 is configured to: remove backlight modules with luminance data exceeding a predetermined luminance data range from a plurality of backlight modules prior to grouping the plurality of backlight modules; or remove LCD panels with transmittance data exceeding a predetermined transmittance data range from a plurality of LCD panels prior to grouping the plurality of LCD panels.

Optionally, the predetermined luminance data range is (u1−k1 σ1, u1+k1σ1), wherein u1 represents the average value of the luminance data of the backlight modules in the N backlight groups, σ1 represents the standard deviation of the luminance data of the backlight modules in the N backlight groups, and 2≤k1≤3; and the predetermined transmittance data range is (u2−k2 σ2, u2+k2 σ2), wherein u2 represents the average value of the transmittance data of the LCD panels in the N panel groups, σ2 represents the standard deviation of the transmittance data of the LCD panels in the N panel groups, and 2≤k2≤3.

Optionally, the number of the plurality of backlight modules and the number of the plurality of LCD panels may be same or different.

Optionally, the LCD device is an LCD device of a VR device.

It is to be noted that, the matching apparatus according to the above embodiment only takes division of all of the above functional modules as an example for explanation during matching of the backlight module and the LCD panel. In practice, division of the above functions may be completed by different functional modules according to requirements. That is, an internal structure of the apparatus may be divided into different functional modules to complete all or part of the functions described above. In addition, the matching apparatus according to the above embodiment has the same concept as the matching method embodiment, and an implementation process thereof is detailed in the method embodiment, which is not repeated herein.

Figure 12:
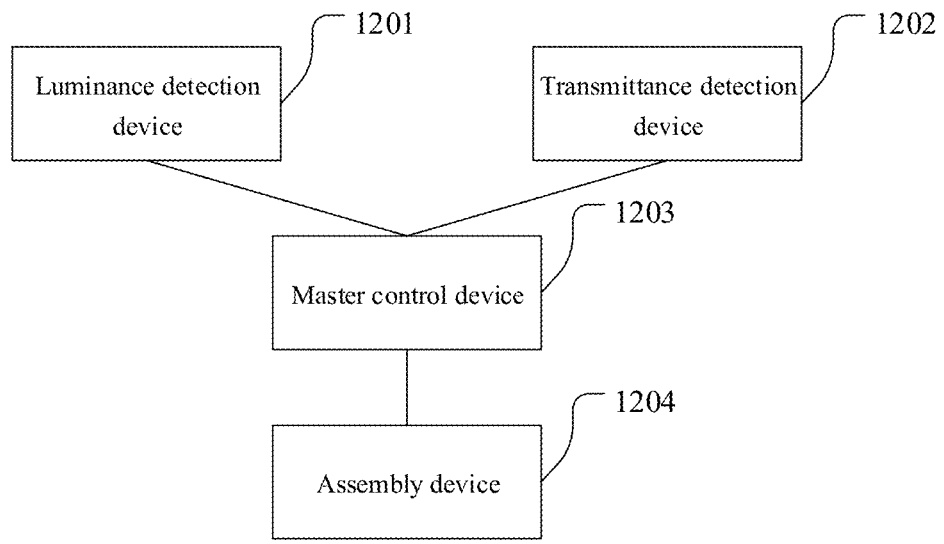
FIG. 12 is a structural schematic diagram of a system for manufacturing an LCD device according to an embodiment of the present disclosure.

Embodiments of the present disclosure further provide a system for manufacturing an LCD device. FIG. 12 is a structural schematic diagram of a system for manufacturing an LCD device according to an embodiment of the present disclosure. The system includes a luminance detection device 1201, configured to detect luminance data of a plurality of backlight modules under the same driving condition; a transmittance detection device 1202, configured to detect transmittance data of a plurality of LCD panels under the same driving condition; a master control device 1203, configured to acquire N backlight groups by grouping the plurality of backlight modules based on the luminance data detected by the luminance data detection device, the luminance data of the backlight modules in different backlight groups being within different luminance ranges; acquire N panel groups by grouping the plurality of LCD panels based on the transmittance data detected by the transmittance detection device, the transmittance data of the LCD panels in different panel groups being within different transmittance ranges; and determine a corresponding relationship between the backlight group and the panel group, wherein the corresponding relationship indicates matching between match a target backlight module and a target LCD panel in pairs, and indicates one-to-one correspondence between the N backlight groups in a descending order of representative values of the luminance range and the N panel groups in an ascending order of representative values of the transmittance range, the target backlight module is any one of the plurality of backlight modules, the target LCD panel is an LCD panel in the panel group corresponding to the backlight group to which the target backlight module belongs; and an assembly device 1204, configured to assemble the target backlight module and the target LCD panel matched in pairs into an LCD device under the control of the master control device.

Optionally, the luminance detection device 1201 may be a luminance meter (e.g., BM-7A).

Optionally, the transmittance detection device 1202 may be a colour analyzer (e.g., CA410).

Optionally, the master control device 1203 may be the matching apparatus for manufacturing an LCD device shown in FIG. 11, for example, a computer device. For relevant content of grouping and matching processes, reference is made to the above embodiments, which is not described in detail herein.

The assembly device 1204 includes a transporter and a laminator. The transporter is configured to transport the target backlight module and the target LCD panel matched in pairs to the laminator under the control of the master control device. Optionally, the transporter includes a conveyor belt, a mechanical arm, and the like. The laminator is configured to laminate the target backlight module and the target LCD panel matched in pairs, so as to assemble the target backlight module and the target LCD panel into the LCD device.

Figure 13:
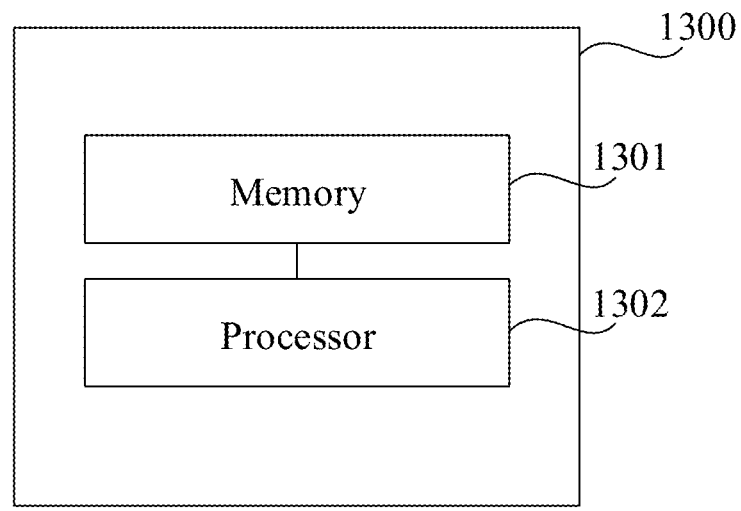
FIG. 13 is a structural schematic diagram of a computer device according to an embodiment of the present disclosure.

Embodiments of the present disclosure further provide a matching apparatus for manufacturing an LCD device. The matching apparatus may be a computer device. The computer device may be configured to perform the method in each of the above embodiments. FIG. 13 is a structural schematic diagram of a computer device according to an embodiment of the present disclosure. Referring to FIG. 13, the computer device 1300 includes a memory 1301 and a processor 1302. Those skilled in the art may understand that a structure of the computer device 1300 shown in FIG. 13 does not constitute a limitation to the computer device 13Y, and may include more or less components than those illustrated, or combine some components, or adopt different component arrangements in practical applications.

The memory 1301 may be configured to store computer programs and modules. The memory 1301 may mainly include a program storage area and a data storage area. The program storage area may store an operating system, an application required for at least one function, and the like. The memory 1301 may include a high-speed random-access memory, and may further include a non-volatile memory, such as at least one magnetic disk memory, a flash memory, or other volatile solid-state memories. Correspondingly, the memory 1301 may further include a memory controller to provide access to the memory 1301 by the processor 1302.

The processor 1302 executes various functional applications and data processing, such as the method according to the embodiment of the present disclosure, by running software programs and modules stored in the memory 1301.

An exemplary embodiment further provides a non-transitory computer-readable storage medium. The computer-readable storage medium stores one or more computer programs. The one or more computer programs, when loaded and run by a processor, cause the processor to perform the method according to the embodiments of the present disclosure.

An exemplary embodiment further provides a computer program product. The computer program product stores one or more instructions. The one or more instructions, when loaded and executed by a processor of a computer, causes the computer to perform the method according to the embodiments of the present disclosure.

An exemplary embodiment further provides a chip. The chip includes a programmable logic circuit and/or one or more program instructions. The chip, when running, is caused to perform the method according to the embodiments of the present disclosure.

Those of ordinary skill may understand that all or part of the steps in the above embodiments may be completed by hardware, or by a program instructing relevant hardware. The program may be stored in a computer-readable storage medium, such as a read-only memory (ROM), a magnetic disk or optical disk, or the like.

Described above are merely optional embodiments of the present disclosure, but are not intended to limit the present disclosure. Any modifications, equivalent replacements, improvements and the like made within the spirit and principles of the present disclosure should be included within the scope of protection of the present disclosure.

What is claimed is:

1. A matching method for manufacturing a liquid crystal display (LCD) device, comprising:
   acquiring luminance data of a plurality of backlight modules and transmittance data of a plurality of LCD panels under a same driving condition;
   acquiring N backlight groups by grouping the plurality of backlight modules based on the luminance data, the luminance data of the backlight modules in different backlight groups being within different luminance ranges;
   acquiring N panel groups by grouping the plurality of LCD panels based on the transmittance data, the transmittance data of the LCD panels in different panel groups being within different transmittance ranges; and
   determining a corresponding relationship between the backlight groups and the panel groups, wherein the corresponding relationship indicates matching between a target backlight module and a target LCD panel in pairs, and indicates one-to-one correspondence between the N backlight groups in a descending order of representative values of the luminance range and the N panel groups in an ascending order of representative values of the transmittance range, the target backlight module being any one of the plurality of backlight modules, the target LCD panel being an LCD panel in the panel group corresponding to the backlight group to which the target backlight module belongs, and the target backlight module and the target LCD panel matched in pairs being configured to be assembled to form the LCD device;
   wherein N is an integer greater than 1;
   a distribution of the luminance data of the plurality of backlight modules satisfies a normal distribution, and grouping the plurality of backlight modules based on the luminance data comprises: grouping the plurality of backlight modules based on a standard normal distribution function; and
   a distribution of the transmittance data of the plurality of LCD panels satisfies the normal distribution, and grouping the plurality of LCD panels based on the transmittance data comprises: grouping the plurality of LCD panels based on the standard normal distribution function.

2. The method according to claim 1, wherein a ratio of a number of backlight modules in a target backlight group to a total number of backlight modules in the N backlight groups is equal to a ratio of a number of LCD panels in a target panel group to a total number of LCD panels in the N panel groups, the target backlight group is any one of the N backlight groups, and the target panel group is a panel group that is in the N panel groups and corresponds to the target backlight group.

3. The method according to claim 1, wherein in response to that N=2,
   grouping the plurality of backlight modules based on the standard normal distribution function comprises:
   organizing backlight modules with the luminance data within a range of (u1−k1 σ1, u1) into a first group, and organizing backlight modules with the luminance data within a range of (u1, u1+k1 σ1) into a second group, wherein u1 represents an average value of the luminance data of the backlight modules in the N backlight groups, k1 represents a predetermined value, $0<k1\leq 3$, and σ1 represents a standard deviation of the luminance data of the backlight modules in the N backlight groups; and grouping the plurality of LCD panels based on the standard normal distribution function comprises:

organizing LCD panels with the transmittance data within a range of (u2−k2σ2, u2) into a first group, and organizing LCD panels with the transmittance data within a range of (u2, u2+k2σ2) into a second group, wherein u2 represents an average value of the transmittance data of the LCD panels in the N panel groups, k2=k1, and σ2 represents a standard deviation of the transmittance data of the LCD panels in the N panel groups.

4. The method according to claim 1, wherein in response to N=3, grouping the plurality of backlight modules based on the standard normal distribution function comprises:

organizing backlight modules with the luminance data within a range of (u1−k11σ1, u1−k12σ1) into a first group, organizing backlight modules with the luminance data within a range of (u1−k12σ1, u1+k12σ1) into a second group, and organizing backlight modules with the luminance data within a range of (u1+k12σ1, u1+k11σ1) into a third group, wherein u1 represents an average value of the luminance data of the backlight modules in the N backlight groups, k11 and k12 represent predetermined values, $0<k12<k11\leq 3$, and σ1 represents a standard deviation of the luminance data of the backlight modules in the N backlight groups; and grouping the plurality of LCD panels based on the standard normal distribution function comprises:

organizing LCD panels with the transmittance data within a range of (u2−k21σ2, u2−k22σ2) into a first group, organizing LCD panels with the transmittance data within a range of (u2−k22σ2, u2+k22σ2) into a second group, and organizing LCD panels with the transmittance data within a range of (u+k22σ2, u+k21σ2) into a third group, wherein u2 represents an average value of the transmittance data of the LCD panels in the N panel groups, k11=k21, k12=k22, and σ2 represents a standard deviation of the transmittance data of the LCD panels in the N panel groups.

5. The method according to claim 1, wherein acquiring the N backlight groups by grouping the plurality of backlight modules based on the luminance data comprises:

ranking the plurality of backlight modules in a first order based on the luminance data, the first order being one of a descending order and an ascending order; and grouping the plurality of backlight modules according to a first predetermined group number and a first predetermined ratio based on a ranking result of the plurality of backlight modules, wherein the first predetermined group number is a number of the backlight groups, and the first predetermined ratio refers to a number ratio of the backlight modules in each two groups of the backlight groups; and acquiring the N panel groups by grouping the plurality of LCD panels based on the transmittance data comprises:

ranking the plurality of LCD panels in a second order based on the transmittance data under the same driving condition, the second order being the other of the descending order and the ascending order; and grouping the plurality of LCD panels according to a second predetermined group number and a second predetermined ratio based on a ranking result of the plurality of LCD panels, wherein the second predetermined group number is a number of the panel groups, the second predetermined ratio refers to a number ratio of the LCD panels in each two groups of the panel groups, the second predetermined group number is equal to the first predetermined group number, and the second predetermined ratio is equal to the first predetermined ratio.

6. The method according to claim 1, further comprising:

removing backlight modules with luminance data exceeding a predetermined luminance data range from the plurality of backlight modules prior to grouping the plurality of backlight modules.

7. The method according to claim 6, wherein the predetermined luminance data range is (u1−kσ1, u1+k1σ1), wherein u1 represents the average value of the luminance data of the backlight modules in the N backlight groups, σ1 represents the standard deviation of the luminance data of the backlight modules in the N backlight groups, and $2\leq k1\leq 3$; and the predetermined transmittance data range is (u2−k2σ2, u2+k2σ2), wherein u2 represents the average value of the transmittance data of the LCD panels in the N panel groups, σ2 represents the standard deviation of the transmittance data of the LCD panels in the N panel groups, and $2\leq k2\leq 3$.

8. A matching apparatus for manufacturing a liquid crystal display (LCD) device, comprising:

a processor; and a memory configured to store one or more instructions executable by the processor;

wherein the processor, when loading and executing the one or more instructions, is caused to perform:

acquiring luminance data of a plurality of backlight modules under a same driving condition and transmittance data of a plurality of LCD panels under the same driving condition;

acquiring N backlight groups by grouping the plurality of backlight modules based on the luminance data, the luminance data of the backlight modules in different backlight groups being within different luminance ranges;

acquiring N panel groups by grouping the plurality of LCD panels based on the transmittance data, the transmittance data of the LCD panels in different panel groups being within different transmittance ranges; and determining a corresponding relationship between the backlight groups and the panel groups, wherein the corresponding relationship indicates matching between a target backlight module and a target LCD panel in pairs, and indicates one-to-one correspondence between the N backlight groups in a descending order of representative values in the luminance ranges and the N panel groups in an ascending order of representative values in the transmittance ranges, the target backlight module is any one of the plurality of backlight modules, the target LCD panel is an LCD panel in the panel group corresponding to the backlight group to which the target backlight module belongs, and the target backlight module and the target LCD panel matched in pairs are configured to be assembled into an LCD device;

wherein N is an integer greater than 1;
a distribution of the luminance data of the plurality of backlight modules satisfies a normal distribution, and grouping the plurality of backlight modules based on the luminance data comprises: grouping the plurality of backlight modules based on a standard normal distribution function; and
a distribution of the transmittance data of the plurality of LCD panels satisfies the normal distribution, and grouping the plurality of LCD panels based on the transmittance data comprises: grouping the plurality of LCD panels based on the standard normal distribution function.

9. The apparatus according to claim 8, wherein a ratio of a number of backlight modules in a target backlight group to a total number of backlight modules in the N backlight groups is equal to a ratio of a number of LCD panels in a target panel group to a total number of LCD panels in the N panel groups, the target backlight group is any one of the N backlight groups, and the target panel group is a panel group that is in the N panel groups and corresponds to the target backlight group.

10. The apparatus according to claim 8, wherein in response to that N=2,
the processor, when loading and executing the one or more instructions, is caused to perform:
organizing backlight modules with the luminance data within a range of (u1-k1σ1, u1) into a first group and organizing backlight modules with the luminance data within a range of (u1, u1+k1σ1) into a second group, wherein u1 represents an average value of the luminance data of the backlight modules in the N backlight groups, k1 represents a predetermined value, 0<k1≤3, and σ1 represents a standard deviation of the luminance data of the backlight modules in the N backlight groups; and
organizing LCD panels with the transmittance data within a range of (u2-k2σ2, u2) into a first group and organize-organizing LCD panels with the transmittance data within a range of (u2, u2+k2σ2) into a second group, wherein u2 represents an average value of the transmittance data of the LCD panels in the N panel groups, k2=k1, and σ2 represents a standard deviation of the transmittance data of the LCD panels in the N panel groups.

11. The apparatus according to claim 8, wherein in response to that N=3,
the processor, when loading and executing the one or more instructions, is caused to perform:
organizing backlight modules with the luminance data within a range of (u1-k11σ1, u1-k12σ1) into a first group, organize-organizing backlight modules with the luminance data within a range of (u1-k12σ1, u1+k12σ1) into a second group, and organize-organizing backlight modules with the luminance data within a range of (u1+k12σ1, u1+k11σ1) into a third group, wherein u1 represents an average value of the luminance data of the backlight modules in the N backlight groups, k11 and k12 represent predetermined values, 0<k12<k11≤3, and σ1 represents a standard deviation of the luminance data of the backlight modules in the N backlight groups; and
organizing LCD panels with the transmittance data within a range of (u2-k21σ2, u2-k22σ2) into a first group, organize-organizing LCD panels with the transmittance data within a range of (u2-k22σ2, u2+k22σ2) into a second group, and organize-organizing LCD panels with the transmittance data within a range of (u+k22σ2, u+k21σ2) into a third group, wherein u2 represents an average value of the transmittance data of the LCD panels in the N panel groups, k11=k21, k12=k22, and σ2 represents a standard deviation of the transmittance data of the LCD panels in the N panel groups.

12. The apparatus according to claim 8, wherein
the processor, when loading and executing the one or more instructions, is caused to perform:
ranking the plurality of backlight modules in a first order based on the luminance data, the first order being one of a descending order and an ascending order; and grouping the plurality of backlight modules according to a first predetermined group number and a first predetermined ratio based on a ranking result of the plurality of backlight modules, wherein the first predetermined group number is the number of the backlight groups, and the first predetermined ratio refers to a number ratio of the backlight modules in each two groups of the backlight groups; and
ranking the plurality of LCD panels in a second order based on the transmittance data, the second order being the other of the descending order and the ascending order; and grouping the plurality of LCD panels according to a second predetermined group number and a second predetermined ratio based on a ranking result of the plurality of LCD panels, wherein the second predetermined group number is the number of the panel groups, the second predetermined ratio refers to a number ratio of the LCD panels in each two groups of the panel groups, the second predetermined group number is equal to the first predetermined group number, and the second predetermined ratio is equal to the first predetermined ratio.

13. The apparatus according to claim 8, wherein the processor, when loading and executing the one or more instructions, is caused to perform:
removing backlight modules with luminance data exceeding a predetermined luminance data range from the plurality of backlight modules prior to grouping the plurality of backlight modules.

14. The apparatus according to claim 13, wherein the predetermined luminance data range is (u1-k1σ1, u1+k1σ1), wherein u1 represents the average value of the luminance data of the backlight modules in the N backlight groups, σ1 represents the standard deviation of the luminance data of the backlight modules in the N backlight groups, and 2≤k1≤3; and
the predetermined transmittance data range is (u2-k2σ2, u2+k2σ2), wherein u2 represents the average value of the transmittance data of the LCD panels in the N panel groups, σ2 represents the standard deviation of the transmittance data of the LCD panels in the N panel groups, and 2≤k2≤3.

15. A system for manufacturing a liquid crystal display (LCD) device, comprising:
a luminance detection device, configured to detect luminance data of a plurality of backlight modules under a same driving condition;
a transmittance detection device, configured to detect transmittance data of a plurality of LCD panels under the same driving condition;
a master control device, configured to acquire N backlight groups by grouping the plurality of backlight modules based on the luminance data detected by the luminance data detection device, the luminance data of the backlight modules in different backlight groups being within different luminance ranges; acquire N panel groups by grouping the plurality of LCD panels based on the transmittance data detected by the transmittance detection device, the transmittance data of the LCD panels in different panel groups being within different transmittance ranges; and determine a corresponding relationship between the backlight groups and the panel groups, wherein the corresponding relationship indicates matching between a target backlight module and a target LCD panel in pairs, and indicates one-to-one correspondence between the N backlight groups in a descending order of representative values of the luminance range and the N panel groups in an ascending order of representative values of the transmittance range, the target backlight module is any one of the plurality of backlight modules, the target LCD panel is an LCD panel in the panel group corresponding to the backlight group to which the target backlight module belongs; and an assembly device, configured to assemble the target backlight module and the target LCD panel matched in pairs into an LCD device under the control of the master control device;

wherein N is an integer greater than 1;

a distribution of the luminance data of the plurality of backlight modules satisfies a normal distribution, and grouping the plurality of backlight modules based on the luminance data comprises: grouping the plurality of backlight modules based on a standard normal distribution function; and a distribution of the transmittance data of the plurality of LCD panels satisfies the normal distribution, and grouping the plurality of LCD panels based on the transmittance data comprises: grouping the plurality of LCD panels based on the standard normal distribution function.

16. A non-transitory computer-readable storage medium storing one or more computer instructions, wherein the one or more computer instructions, when loaded and executed by a processor, cause the processor to perform the method as defined in claim 1.

17. The method according to claim 1, further comprising:
removing LCD panels with transmittance data exceeding a predetermined transmittance data range from the plurality of LCD panels prior to grouping the plurality of LCD panels.

18. The apparatus according to claim 8, wherein the processor, when loading and executing the one or more instructions, is caused to perform:
removing LCD panels with transmittance data exceeding a predetermined transmittance data range from the plurality of LCD panels prior to grouping the plurality of LCD panels.

* * * * *